United States Patent
Xin et al.

(10) Patent No.: US 12,255,785 B2
(45) Date of Patent: Mar. 18, 2025

(54) COMMUNICATION METHOD, APPARATUS, AND SYSTEM

(71) Applicant: HUAWEI TECHNOLOGIES CO., LTD., Shenzhen (CN)

(72) Inventors: Yang Xin, Shanghai (CN); Weiwei Chong, Shenzhen (CN); Xiaobo Wu, Shenzhen (CN); Yali Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/976,261

(22) Filed: Oct. 28, 2022

(65) Prior Publication Data

US 2023/0083982 A1    Mar. 16, 2023

Related U.S. Application Data

(63) Continuation of application No. PCT/CN2021/075317, filed on Feb. 4, 2021.

(30) Foreign Application Priority Data

Apr. 29, 2020 (CN) .......................... 202010359339.6

(51) Int. Cl.
*H04L 41/16* (2022.01)
*H04L 41/14* (2022.01)

(52) U.S. Cl.
CPC .............. *H04L 41/16* (2013.01); *H04L 41/14* (2013.01)

(58) Field of Classification Search
CPC ....... H04L 41/14; H04L 41/145; H04L 41/16; H04L 41/5058; G06N 3/098
See application file for complete search history.

(56) References Cited

U.S. PATENT DOCUMENTS

2011/0104654 A1*  5/2011  Eom ................. G06Q 10/10
                                                  434/351
2020/0401886 A1* 12/2020  Deng ................. G06N 3/088
(Continued)

FOREIGN PATENT DOCUMENTS

CN    109600243 A    4/2019
CN    110119808 A    8/2019
(Continued)

OTHER PUBLICATIONS

China Mobile et al, "KI#2, Sol#24: Update to Federated Learning among Multiple NWDAF Instances", 3GPP TSG SA2 Meeting #141E e-meeting S2-2008025, Oct. 25, 2020,total 10 pages.
(Continued)

*Primary Examiner* — Gil H. Lee
(74) *Attorney, Agent, or Firm* — HAUPTMAN HAM, LLP

(57) ABSTRACT

A communication method includes sending, by a first data analytics network element, a first request to a service discovery network element. The first request requests information about a second data analytics network element. The first request includes one or more of information about distributed learning or first indication information. The information about distributed learning includes a type of distributed learning. The first indication information indicates a type of the second data analytics network element. The method also includes receiving, by the first data analytics network element, information about the second data analytics network element from the service discovery network element. The second data analytics network element supports the type of distributed learning.

17 Claims, 14 Drawing Sheets

(56) References Cited

U.S. PATENT DOCUMENTS

| | | | |
|---|---|---|---|
| 2021/0051169 A1* | 2/2021 | Karame | G06N 20/00 |
| 2021/0117780 A1* | 4/2021 | Malik | G06Q 10/109 |
| 2021/0256309 A1* | 8/2021 | Huth | G06F 18/2148 |

FOREIGN PATENT DOCUMENTS

| | | |
|---|---|---|
| CN | 110677299 A | 1/2020 |
| CN | 110831029 A | 2/2020 |
| CN | 110972193 A | 4/2020 |
| EP | 4099635 A1 | 12/2022 |
| WO | 2019158777 A1 | 8/2019 |
| WO | 2020076144 A1 | 4/2020 |

OTHER PUBLICATIONS

International Search Report issued in corresponding International Application No. PCT/CN2021/075317, mailed Apr. 22, 2021, pp. 1-10.

Huawei, HiSilicon, Correction on Policy Control information to support QoS Monitoring. 3GPP TSG-WG SA2 Meeting #135, Split, Croatia, Oct. 14-18, 2019, S2-1908887, 23 pages.

Chinese Office Action issued in corresponding Chinese Application No. 202010359339.6, dated Jan. 4, 2023, pp. 1-7.

Isaksson Martin et al: "Secure Federated Learning in 5G Mobile Networks", Apr. 14, 2020, pp. 1-7, XP055793363.

Solmaz Niknam et al: "Federated Learning for Wireless Communications: Motivation, Opportunities and Challenges", Jul. 30, 2019, XP081463430, total 6 pages.

Extended European Search Report issued in corresponding European Application No. 21797488.0, dated Jul. 31, 2023, pp. 1-12.

3GPP TS 23.288 V16.3.0 (Mar. 2020), 3rd Generation Partnership Project; Technical Specification Group Services and System Aspects; Architecture enhancements for 5G System (5GS) to support network data analytics services(Release 16), 62 pages.

3GPP TS 23.502 V16.4.0 (Mar. 2020), 3rd Generation Partnership Project; Technical Specification Group Services and System Aspects; Procedures for the 5G System (5GS); Stage 2(Release 16), 582 pages.

3GPP TS 29.510 V16.3.0 (Mar. 2020), 3rd Generation Partnership Project; Technical Specification Group Core Network and Terminals; 5G System; Network Function Repository Services; Stage 3(Release 16), 172 pages.

\* cited by examiner

COMMUNICATION METHOD, APPARATUS, AND SYSTEM

CROSS-REFERENCE TO RELATED APPLICATIONS

This is a continuation of International Patent Application No. PCT/CN2021/075317, filed on Feb. 4, 2021, which claims priority to Chinese Patent Application No. 202010359339.6, filed on Apr. 29, 2020. The disclosures of the aforementioned applications are hereby incorporated by reference in their entireties.

TECHNICAL FIELD

Embodiments of this application relate to the field of data analytics, and in particular, to a communication method, apparatus, and system.

BACKGROUND

A network data analytics function (NWDAF) network element provides the following functions: data collection (for example, collecting core network data, network management data, service data, and terminal data), data analytics, and data analytics result feedback.

Currently, due to benefit consideration, each domain (for example, a terminal, an access network, a core network, a network management system, and a service provider) is unwilling to open data to another domain. As a result, data is isolated from each other, and a data analytics center (for example, the NWDAF network element) cannot centralize data of each domain and does not support collaborative data analytics between domains. Consequently, a data analytics scenario is limited.

SUMMARY

Embodiments of this application provide a communication method, apparatus, and system, so that a data analytics application scenario can be extended.

According to a first aspect, an embodiment of this application provides a communication method, including: A first data analytics network element sends, to a service discovery network element, a first request that requests information about a second data analytics network element, where the first request includes one or more of information about distributed learning and first indication information indicates a type of the second data analytics network element, and the information about distributed learning includes a type of distributed learning requested by the first data analytics network element. The first data analytics network element receives information about one or more second data analytics network elements from the service discovery network element, where the second data analytics network element supports the type of distributed learning requested by the first data analytics network element.

This embodiment of this application provides a communication method. In the method, the first data analytics network element sends the first request to the service discovery network element, and requests, from the service discovery network element by using the first request, a feature of the second data analytics network element required by the first data analytics network element. In this way, the service discovery network element provides, for the first data analytics network element based on the first request, the information about the one or more second data analytics network elements that support the type of distributed learning. In addition, a type of the second data analytics network element is the same as a type of a second data analytics network element requested by the first data analytics network element. In this solution, in an aspect, the first data analytics network element can find, by using the service discovery network element, a data analytics network element that can perform distributed learning based training. In another aspect, after obtaining the information about the one or more second data analytics network elements, the first data analytics network element can subsequently collaborate with the one or more second data analytics network elements to implement model training when the first data analytics network element is to perform model training, so that a data analytics application scenario can be extended.

In a possible implementation, the method provided in this embodiment of this application may further include: The first data analytics network element determines, based on the information about the one or more second data analytics network elements, information about a third data analytics network element that performs distributed learning. There is one or more third data analytics network elements. For example, the first data analytics network element determines, based on the information about the one or more second data analytics network elements, information about the one or more third data analytics network elements that perform distributed learning. In this solution, because the one or more third data analytics network elements can perform distributed learning based training, in a subsequent distributed learning based training process, the third data analytics network element may not need to provide data for the first data analytics network element, so that the data may not be transmitted out of a local domain of the third data analytics network element, and the first data analytics network element may still perform model training. On one hand, a data leakage problem is avoided. On the other hand, model training may still be performed when data exchange cannot be performed between the first data analytics network element and the third data analytics network element. In addition, because data training is performed on each third data analytics network element, the distributed training process may also accelerate an entire model training speed.

In a possible implementation, load of the third data analytics network element is lower than a preset load threshold; or a priority of the third data analytics network element is higher than a preset priority threshold, where a range of the third data analytics network element falls within a range of the first data analytics network element. The range of the third data analytics network element includes a public land mobile network PLMN identifier to which the third data analytics network element belongs, a range of a network slice instance served by the third data analytics network element, a data network name DNN served by the third data analytics network element, and device vendor information of the third data analytics network element.

In a possible implementation, the first request further includes the range of the first data analytics network element, and correspondingly, a range of the second data analytics network element or a range of the third data analytics network element falls within the range of the first data analytics network element. If the first request further includes the range of the first data analytics network element, the first request requests one or more second data analytics network elements that are located within the range of the first data analytics network element and that support the type of distributed learning requested by the first data analytics network element.

In a possible implementation, the range of the first data analytics network element includes one or more of the following information: an area served by the first data analytics network element, a public land mobile network PLMN identifier to which the first data analytics network element belongs, information about a network slice served by the first data analytics network element, a data network name DNN served by the first data analytics network element, or device vendor information of the first data analytics network element.

In a possible implementation, the information about distributed learning further includes algorithm information supported by distributed learning, and correspondingly, the second data analytics network element or the third data analytics network element supports an algorithm corresponding to the algorithm information supported by distributed learning. In this way, the one or more second data analytics network elements provided by the service discovery network element for the first data analytics network element further support the algorithm information.

In a possible implementation, the algorithm information supported by distributed learning includes one or more of an algorithm type, an algorithm identifier, and algorithm performance. It may be understood that algorithm information supported by different second data analytics network elements may be the same or different.

In a possible implementation, the method provided in this embodiment of this application further includes: The first data analytics network element receives a sub-model from the one or more third data analytics network elements, where the sub-model is obtained by the third data analytics network element through training based on data obtained by the third data analytics network element. The first data analytics network element determines an updated model based on the sub-model of the one or more third data analytics network elements. The first data analytics network element sends the updated model to the one or more third data analytics network elements. Because the first data analytics network element obtains the updated model based on the sub-model provided by different data analytics network element in the one or more third data analytics network elements, each third data analytics network element may not need to provide data used for training for the first data analytics network element, to avoid data leakage.

In a possible implementation, the method provided in this embodiment of this application further includes: The first data analytics network element determines a target model based on the updated model. The first data analytics network element sends, to the one or more second data analytics network elements, the target model and one or more of the following information corresponding to the target model: a model identifier, a model version identifier, or a data analytics identifier. In this way, each second data analytics network element may obtain the target model determined by the first data analytics network element. For example, the target model may be a service experience model.

In a possible implementation, before that the first data analytics network element receives a sub-model from the one or more third data analytics network elements, the method provided in this embodiment of this application further includes: The first data analytics network element sends a configuration parameter to the one or more third data analytics network elements, where the configuration parameter is a parameter used by the third data analytics network element to train the sub-model. In this way, the third data analytics network element configures a related parameter in the distributed learning based training process based on the configuration parameter.

In a possible implementation, the configuration parameter includes one or more of the following information: an initial model, a training set selection criterion, a feature generation method, a training termination condition, maximum training time, or maximum waiting time.

In a possible implementation, the type of distributed learning includes one of horizontal learning, vertical learning, and transfer learning.

In a possible implementation, the type of the second data analytics network element is one of the following: a client, a local trainer, or a partial trainer.

In a possible implementation, the method provided in this embodiment of this application further includes: The first data analytics network element sends, to the service discovery network element, a second request that requests to register information about the first data analytics network element, where the information about the first data analytics network element includes one or more of the following information corresponding to the first data analytics network element: the information about distributed learning or second indication information, and the second indication information indicates a type of the first data analytics network element. In this way, the information about the first data analytics network element is registered, so that another device subsequently determines the first data analytics network element by using the service discovery network element.

In a possible implementation, the information about the first data analytics network element further includes one or more of the range of the first data analytics network element, an identifier of the first data analytics network element, and address information of the first data analytics network element.

In a possible implementation, the type of the first data analytics network element includes one of the following information: a server, a coordinator, a centralized trainer, and a global trainer.

In a possible implementation, distributed learning is federated learning.

In a possible implementation, the second data analytics network element is a terminal.

According to a second aspect, an embodiment of this application provides a communication method. The method includes: A service discovery network element receives, from a first data analytics network element, a first request that requests information about a second data analytics network element, where the first request includes one or more of the following information: information about distributed learning and first indication information, the information about distributed learning includes a type of distributed learning requested by the first data analytics network element, and the first indication information indicates a type of the second data analytics network element. The service discovery network element determines, based on the first request, information about one or more second data analytics network elements that support the type of distributed learning. The service discovery network element sends the information about the one or more second data analytics network elements to the first data analytics network element.

In a possible implementation, the first request in the method provided in this embodiment of this application further includes a range of the first data analytics network element, and correspondingly, a range of the second data analytics network element falls within the range of the first data analytics network element. For example, that the service discovery network element determines, based on the first request, information about one or more second data analytics network elements that support the type of distributed learning includes: The service discovery network element determines, as the one or more second data analytics network elements, one or more data analytics network elements that are located within the range of the first data analytics network element and that support the type of distributed learning.

In a possible implementation, the information about distributed learning further includes algorithm information supported by distributed learning, and correspondingly, the second data analytics network element supports an algorithm corresponding to the algorithm information supported by distributed learning. For example, that a service discovery network element determines, based on the first request, information about one or more second data analytics network elements that support the type of distributed learning includes: The service discovery network element determines, as the one or more second data analytics network elements, one or more data analytics network elements that support the type of distributed learning and the algorithm information supported by distributed learning.

In a possible implementation, the method provided in this embodiment of this application further includes: The service discovery network element receives, from the first data analytics network element, a second request that requests to register information about the first data analytics network element, where the information about the first data analytics network element includes one or more of the following information corresponding to the first data analytics network element: the information about distributed learning or second indication information, and the second indication information indicates a type of the first data analytics network element. The service discovery network element registers the information about the first data analytics network element based on the second request.

In a possible implementation, the information about the first data analytics network element further includes one or more of the range of the first data analytics network element, an identifier of the first data analytics network element, and address information of the first data analytics network element.

In a possible implementation, that the service discovery network element registers the information about the first data analytics network element based on the second request includes: The service discovery network element stores the information about the first data analytics network element in the service discovery network element, or the service discovery network element stores the information about the first data analytics network element in a user data management network element.

In a possible implementation, the method provided in this embodiment of this application further includes: The service discovery network element receives, from the one or more second data analytics network elements, a third request that requests to register the information about the second data analytics network element, where the information about the second data analytics network element includes one or more of the following information corresponding to the second data analytics network element: the information about distributed learning and third indication information, and the third indication information indicates the type of the second data analytics network element. The service discovery network element registers the information about the one or more second data analytics network elements based on the third request.

In a possible implementation, the information about the second data analytics network element further includes one or more of the range of the second data analytics network element, an identifier of the second data analytics network element, and address information of the second data analytics network element.

In a possible implementation, that the service discovery network element registers the information about the one or more second data analytics network elements based on the third request includes: The service discovery network element stores the information about the one or more second data analytics network elements in the service discovery network element.

In a possible implementation, that the service discovery network element registers the information about the one or more second data analytics network elements based on the third request includes: The service discovery network element stores the information about the one or more second data analytics network elements in the user data management network element.

In a possible implementation, the type of the first data analytics network element includes one of the following information: a server, a coordinator, a centralized trainer, and a global trainer.

In a possible implementation, the type of the second data analytics network element includes one of the following information: a client, a local trainer, or a partial trainer.

In a possible implementation, distributed learning is federated learning.

In a possible implementation, the second data analytics network element is a terminal.

According to a third aspect, an embodiment of this application provides a communication method. The method includes: A third data analytics network element determines a sub-model, where the sub-model is obtained by the third data analytics network element through training based on data obtained by the third data analytics network element; and the third data analytics network element sends the sub-model to the first data analytics network element.

In a possible implementation, the method provided in this embodiment of this application may further include: The sub-model is obtained by the third data analytics network element through training based on data obtained by the third data analytics network element from a range of the third data analytics network element.

In a possible implementation, the method provided in this embodiment of this application may further include: The third data analytics network element receives an updated model from the first data analytics network element, where the updated model is obtained by using sub-models provided by a plurality of different third data analytics network elements.

In a possible implementation, the method provided in this embodiment of this application may further include: The third data analytics network element receives a target model from the first data analytics network element.

In a possible implementation, the method provided in this embodiment of this application may further include: The third data analytics network element receives a configuration parameter from the first data analytics network element, where the configuration parameter is a parameter used by the third data analytics network element to train the sub-model.

In a possible implementation, the configuration parameter includes one or more of the following information: an initial model, a training set selection criterion, a feature generation method, a training termination condition, maximum training time, or maximum waiting time.

In a possible implementation, a type of distributed learning includes one of horizontal learning, vertical learning, and transfer learning.

In a possible implementation, a type of the third data analytics network element is one of the following: a client, a local trainer, or a partial trainer.

In a possible implementation, the range of the third data analytics network element falls within a range of the first data analytics network element.

In a possible implementation, the method provided in this embodiment of this application may further include: The third data analytics network element sends, to a service discovery network element, a third request that requests to register information about the third data analytics network element, where the information about the third data analytics network element includes one or more of the following information corresponding to the third data analytics network element: information about distributed learning or third indication information, and the third indication information indicates the type of the third data analytics network element. The information about distributed learning corresponding to the third data analytics network element includes a type of distributed learning supported by the third data analytics network element and/or algorithm information supported by distributed learning supported by the third data analytics network element.

In a possible implementation, the information about the third data analytics network element further includes one or more of the range of the third data analytics network element, an identifier of the third data analytics network element, and address information of the third data analytics network element.

In a possible implementation, a type of the first data analytics network element includes one of the following information: a server, a coordinator, a centralized trainer, and a global trainer.

In a possible implementation, distributed learning is federated learning.

According to a fourth aspect, an embodiment of this application provides a communication apparatus. The communication apparatus may implement the communication method according to any one of the first aspect or the possible implementations of the first aspect, and therefore may further implement beneficial effects according to any one of the first aspect or the possible implementations of the first aspect. The communication apparatus may be a first data analytics network element, or may be an apparatus that may support the first data analytics network element in implementing any one of the first aspect or the possible implementations of the first aspect, for example, a chip used in the first data analytics network element. The communication apparatus may implement the foregoing methods by using software or hardware, or by executing corresponding software by hardware.

In an example, this embodiment of this application provides a communication apparatus, including a communication unit and a processing unit, where the communication unit is configured to receive and send information, and the processing unit is configured to process information. For example, the communication unit is configured to send, to a service discovery network element, a first request that requests information about a second data analytics network element, where the first request includes one or more of information about distributed learning and first indication information indicates a type of the second data analytics network element, and the information about distributed learning includes a type of distributed learning requested by the first data analytics network element. The communication unit is further configured to receive information about one or more second data analytics network elements from the service discovery network element, where the second data analytics network element supports the type of distributed learning requested by the first data analytics network element.

In a possible implementation, the processing unit is configured to determine, based on the information about the one or more second data analytics network elements, information about a third data analytics network element that performs distributed learning, where there is one or more third data analytics network elements.

In a possible implementation, load of the third data analytics network element is lower than a preset load threshold; or a priority of the third data analytics network element is higher than a preset priority threshold, where a range of the third data analytics network element falls within a range of the first data analytics network element.

In a possible implementation, the first request further includes the range of the first data analytics network element, and correspondingly, a range of the second data analytics network element or a range of the third data analytics network element falls within the range of the first data analytics network element. It may be understood that, if the first request further includes the range of the first data analytics network element, the first request requests one or more second data analytics network elements that are located within the range of the first data analytics network element and that support the type of distributed learning requested by the first data analytics network element.

In a possible implementation, the range of the first data analytics network element includes one or more of the following information: an area served by the first data analytics network element, a public land mobile network PLMN identifier to which the first data analytics network element belongs, information about a network slice served by the first data analytics network element, a data network name DNN served by the first data analytics network element, or device vendor information of the first data analytics network element.

In a possible implementation, the information about distributed learning further includes algorithm information supported by distributed learning, and correspondingly, the second data analytics network element or the third data analytics network element supports an algorithm corresponding to the algorithm information supported by distributed learning. In this way, the one or more second data analytics network elements provided by the service discovery network element for the first data analytics network element further support the algorithm information supported by distributed learning.

In a possible implementation, the algorithm information supported by distributed learning includes one or more of an algorithm type, an algorithm identifier, and algorithm performance. It may be understood that algorithm information supported by different second data analytics network elements or third data analytics network elements may be the same or different.

In a possible implementation, the communication unit is further configured to receive a sub-model from the one or more third data analytics network elements, where the sub-model is obtained by the third data analytics network element through training based on data obtained by the third data analytics network element. The processing unit is configured to determine an updated model based on the sub-model of the one or more third data analytics network elements. The communication unit is further configured to send the updated model to the one or more third data analytics network elements.

In a possible implementation, the processing unit is further configured to determine a target model based on the updated model. The communication unit is further configured to send, to the one or more second data analytics network elements, the target model and one or more of the following information corresponding to the target model: a model identifier, a model version identifier, or a data analytics identifier. Although not all of the one or more second data analytics network elements participate in a training process of the target model, each second data analytics network element may obtain, by sending the target model to the one or more second data analytics network elements, the target model determined by the first data analytics network element. For example, the target model may be a service experience model.

In a possible implementation, the communication unit is further configured to send a configuration parameter to the one or more third data analytics network elements, where the configuration parameter is a parameter used by the third data analytics network element to train the sub-model. In this way, the third data analytics network element configures a related parameter in a distributed learning based training process based on the configuration parameter.

In a possible implementation, the configuration parameter includes one or more of the following information: an initial model, a training set selection criterion, a feature generation method, a training termination condition, maximum training time, or maximum waiting time.

In a possible implementation, the type of distributed learning includes one of horizontal learning, vertical learning, and transfer learning.

In a possible implementation, the type of the second data analytics network element is one of the following: a client, a local trainer, or a partial trainer.

In a possible implementation, the communication unit is further configured to send, to the service discovery network element, a second request that requests to register information about the first data analytics network element. The information about the first data analytics network element includes one or more of the following information corresponding to the first data analytics network element: the information about distributed learning and second indication information, and the second indication information indicates a type of the first data analytics network element. In this way, the information about the first data analytics network element is registered, so that another device subsequently determines the first data analytics network element by using the service discovery network element.

In a possible implementation, the information about the first data analytics network element further includes one or more of the range of the first data analytics network element, an identifier of the first data analytics network element, and address information of the first data analytics network element.

In a possible implementation, the type of the first data analytics network element includes one of the following information: a server, a coordinator, a centralized trainer, and a global trainer.

In a possible implementation, distributed learning is federated learning.

In a possible implementation, the second data analytics network element is a terminal.

In another example, this embodiment of this application provides a communication apparatus. The communication apparatus may be the first data analytics network element, or may be the apparatus (for example, a chip) used in the first data analytics network element. The communication apparatus may include the processing unit and the communication unit. The communication apparatus may further include a storage unit. The storage unit is configured to store computer program code. The computer program code includes instructions. The processing unit executes the instructions stored in the storage unit, to enable the communication apparatus to implement the method according to any one of the first aspect or the possible implementations of the first aspect. When the communication apparatus is the first data analytics network element, the processing unit may be a processor. The communication unit may be a communication interface. The storage unit may be a memory. When the communication apparatus is the chip in the first data analytics network element, the processing unit may be the processor, and the communication unit may be collectively referred to as the communication interface. For example, the communication interface may be an input/output interface, a pin, or a circuit. The processing unit executes the computer program code stored in the storage unit, to enable the first data analytics network element to implement the method according to any one of the first aspect or the possible implementations of the first aspect. The storage unit may be a storage unit (for example, a register or a cache) in the chip, or may be a storage unit (for example, a read-only memory or a random access memory) that is in the first data analytics network element and that is outside the chip.

In a possible implementation, the processor, the communication interface, and the memory are coupled to each other.

According to a fifth aspect, an embodiment of this application provides a communication apparatus. The communication apparatus may implement the communication method according to any one of the second aspect or the possible implementations of the second aspect, and therefore may further implement beneficial effects according to any one of the second aspect or the possible implementations of the second aspect. The communication apparatus may be a service discovery network element, or may be an apparatus that may support the service discovery network element in implementing any one of the second aspect or the possible implementations of the second aspect, for example, a chip used in a service discovery network element. The communication apparatus may implement the foregoing methods by using software or hardware, or by executing corresponding software by hardware.

In an example, this embodiment of this application provides a communication apparatus, including: a communication unit, configured to receive, from a first data analytics network element, a first request that requests information about a second data analytics network element, where the first request includes one or more of the following information: information about distributed learning and first indication information, the information about distributed learning includes a type of distributed learning requested by the first data analytics network element, and the first indication information indicates a type of the second data analytics network element; and a processing unit, configured to determine, based on the first request, information about one or more second data analytics network elements that support the type of distributed learning. The communication unit is further configured to send the information about the one or more second data analytics network elements to the first data analytics network element.

In a possible implementation, the first request in the method provided in this embodiment of this application further includes a range of the first data analytics network element, and correspondingly, a range of the second data analytics network element falls within the range of the first data analytics network element. For example, that a service discovery network element determines, based on the first request, information about one or more second data analytics network elements that support the type of distributed learning includes: The service discovery network element determines, as the one or more second data analytics network elements, one or more data analytics network elements that are located within the range of the first data analytics network element and that support the type of distributed learning.

In a possible implementation, the information about distributed learning further includes algorithm information supported by distributed learning, and correspondingly, the second data analytics network element supports an algorithm corresponding to the algorithm information supported by distributed learning. For example, that the processing unit is configured to determine, based on the first request, information about one or more second data analytics network elements that support the type of distributed learning includes: The processing unit is configured to determine, as the one or more second data analytics network elements, one or more data analytics network elements that support the type of distributed learning and the algorithm information supported by distributed learning.

In a possible implementation, the communication unit is further configured to receive, from the first data analytics network element, a second request that requests to register information about the first data analytics network element, where the information about the first data analytics network element includes one or more of the following information corresponding to the first data analytics network element: information about distributed learning and second indication information. The second indication information indicates a type of the first data analytics network element. The processing unit is configured to register the information about the first data analytics network element based on the second request. The information about distributed learning corresponding to the first data analytics network element includes a type of distributed learning supported by the first data analytics network element and/or algorithm information supported by distributed learning supported by the first data analytics network element.

In a possible implementation, the information about the first data analytics network element further includes one or more of the range of the first data analytics network element, an identifier of the first data analytics network element, and address information of the first data analytics network element.

In a possible implementation, that the processing unit is configured to register the information about the first data analytics network element based on the second request includes: The processing unit is configured to store the information about the first data analytics network element in the service discovery network element, or the processing unit is configured to store the information about the first data analytics network element in a user data management network element.

In a possible implementation, the communication unit is further configured to receive, from the one or more second data analytics network elements, a third request that requests to register the information about the second data analytics network element, where the information about the second data analytics network element includes one or more of the following information corresponding to the second data analytics network element: the information about distributed learning or third indication information, and the third indication information indicates a type of the second data analytics network element. The processing unit is configured to register the information about the one or more second data analytics network elements based on the third request. The information about distributed learning corresponding to the second data analytics network element includes the type of distributed learning supported by the second data analytics network element and/or the algorithm information supported by distributed learning supported by the second data analytics network element.

In a possible implementation, the information about the second data analytics network element further includes one or more of a range of the second data analytics network element, an identifier of the second data analytics network element, and address information of the second data analytics network element.

In a possible implementation, that the processing unit is configured to register the information about the one or more second data analytics network elements based on the third request includes: The processing unit is configured to store the information about the one or more second data analytics network elements in the service discovery network element, or the processing unit is configured to store the information about the one or more second data analytics network elements in the user data management network element.

In a possible implementation, the type of the first data analytics network element includes one or more of the following information: a server, a coordinator, a centralized trainer, and a global trainer.

In a possible implementation, the type of the second data analytics network element is one of the following: a client, a local trainer, or a partial trainer.

In a possible implementation, distributed learning includes federated learning.

In a possible implementation, the second data analytics network element is a terminal.

In another example, this embodiment of this application provides a communication apparatus. The communication apparatus may be the service discovery network element, or may be the chip in the service discovery network element. The communication apparatus may include the processing unit and the communication unit. The communication apparatus may further include a storage unit. The storage unit is configured to store computer program code. The computer program code includes instructions. The processing unit executes the instructions stored in the storage unit, to enable the communication apparatus to implement the method according to any one of the second aspect or the possible implementations of the second aspect. When the communication apparatus is the service discovery network element, the processing unit may be a processor. The communication unit may be a communication interface. The storage unit may be a memory. When the communication apparatus is the chip in the service discovery network element, the processing unit may be the processor, and the communication unit may be collectively referred to as the communication interface. For example, the communication interface may be an input/output interface, a pin, or a circuit. The processing unit executes the computer program code stored in the storage unit, to enable the service discovery network element to implement the method according to any one of the second aspect or the possible implementations of the second aspect. The storage unit may be a storage unit (for example, a register or a cache) in the chip, or may be a storage unit (for example, a read-only memory or a random access memory) that is in the service discovery network element and that is outside the chip.

In a possible implementation, the processor, the communication interface, and the memory are coupled to each other.

According to a sixth aspect, an embodiment of this application provides a communication apparatus. The communication apparatus may implement the communication method according to any one of the third aspect or the possible implementations of the third aspect, and therefore may also implement beneficial effects according to any one of the third aspect or the possible implementations of the third aspect. The communication apparatus may be a third data analytics network element, or may be an apparatus that may support the third data analytics network element in implementing any one of the third aspect or the possible implementations of the third aspect, for example, a chip used in the third data analytics network element. The communication apparatus may implement the foregoing methods by using software or hardware, or by executing corresponding software by hardware.

In an example, this embodiment of this application provides a communication apparatus. The apparatus includes a processing unit, configured to determine a sub-model, where the sub-model is obtained by the processing unit through training based on data obtained by a communication unit; and the communication unit, configured to send the sub-model to a first data analytics network element.

In a possible implementation, the communication unit is further configured to receive an updated model from the first data analytics network element, where the updated model is obtained by using sub-models provided by a plurality of different third data analytics network elements.

In a possible implementation, the communication unit is further configured to receive a target model from the first data analytics network element.

In a possible implementation, the communication unit is further configured to receive a configuration parameter from the first data analytics network element, where the configuration parameter is a parameter used by the third data analytics network element to train the sub-model.

In a possible implementation, the configuration parameter includes one or more of the following information: an initial model, a training set selection criterion, a feature generation method, a training termination condition, maximum training time, or maximum waiting time.

In a possible implementation, a type of distributed learning includes one of horizontal learning, vertical learning, and transfer learning.

In a possible implementation, the communication unit is further configured to send, to a service discovery network element, a third request that requests to register information about the third data analytics network element, where the information about the third data analytics network element includes one or more of the following information corresponding to the third data analytics network element: information about distributed learning or third indication information, and the third indication information indicates a type of the third data analytics network element. The information about distributed learning corresponding to the third data analytics network element includes a type of distributed learning supported by the third data analytics network element and/or algorithm information supported by distributed learning supported by the third data analytics network element.

In a possible implementation, the information about the third data analytics network element further includes one or more of a range of the third data analytics network element, an identifier of the third data analytics network element, and address information of the third data analytics network element.

In a possible implementation, a type of the first data analytics network element includes one of the following information: a server, a coordinator, a centralized trainer, and a global trainer.

In a possible implementation, distributed learning is federated learning.

In a possible implementation, the type of the third data analytics network element is one of the following information: a client, a local trainer, or a partial trainer.

In a possible implementation, the range of the third data analytics network element falls within a range of the first data analytics network element.

In another example, this embodiment of this application provides a communication apparatus. The communication apparatus may be the third data analytics network element, or may be the chip in the third data analytics network element. The communication apparatus may include the processing unit and the communication unit. The communication apparatus may further include a storage unit. The storage unit is configured to store computer program code. The computer program code includes instructions. The processing unit executes the instructions stored in the storage unit, to enable the communication apparatus to implement the method according to any one of the third aspect or the possible implementations of the third aspect. When the communication apparatus is the third data analytics network element, the processing unit may be a processor. The communication unit may be a communication interface. The storage unit may be a memory. When the communication apparatus is the chip in the third data analytics network element, the processing unit may be the processor, and the communication unit may be collectively referred to as the communication interface. For example, the communication interface may be an input/output interface, a pin, or a circuit. The processing unit executes the computer program code stored in the storage unit, to enable the third data analytics network element to implement the method according to any one of the third aspect or the possible implementations of the third aspect. The storage unit may be a storage unit (for example, a register or a cache) in the chip, or may be a storage unit (for example, a read-only memory or a random access memory) that is in the third data analytics network element and that is outside the chip.

In a possible implementation, the processor, the communication interface, and the memory are coupled to each other.

According to a seventh aspect, an embodiment of this application provides a computer program product including instructions. When the instructions are run on a computer, the computer is enabled to perform the communication method according to any one of the first aspect or the possible implementations of the first aspect.

According to an eighth aspect, an embodiment of this application provides a computer program product including instructions. When the instructions are run on a computer, the computer is enabled to perform the communication method according to any one of the second aspect or the possible implementations of the second aspect.

According to a ninth aspect, an embodiment of this application provides a computer program product including instructions. When the instructions are run on a computer, the computer is enabled to perform the communication method according to any one of the third aspect or the possible implementations of the third aspect.

According to a tenth aspect, an embodiment of this application provides a computer-readable storage medium. The computer readable storage medium stores a computer program or instructions. When the computer program or the instructions are run on a computer, the computer is enabled to perform the communication method according to any one of the first aspect or the possible implementations of the first aspect.

According to an eleventh aspect, an embodiment of this application provides a computer-readable storage medium. The computer readable storage medium stores a computer program or instructions. When the computer program or the instructions are run on a computer, the computer is enabled to perform the communication method according to any one of the second aspect or the possible implementations of the second aspect.

According to a twelfth aspect, an embodiment of this application provides a computer-readable storage medium. The computer readable storage medium stores a computer program or instructions. When the computer program or the instructions are run on a computer, the computer is enabled to perform the communication method according to any one of the third aspect or the possible implementations of the third aspect.

According to a thirteenth aspect, an embodiment of this application provides a communication apparatus. The communication apparatus includes at least one processor, and the at least one processor is configured to run a computer program or instructions stored in a memory, to implement the communication method according to any one of the first aspect or the possible implementations of the first aspect.

According to a fourteenth aspect, an embodiment of this application provides a communication apparatus. The communication apparatus includes at least one processor, and the at least one processor is configured to run a computer program or instructions stored in a memory, to implement the communication method according to any one of the second aspect or the possible implementations of the second aspect.

According to a fifteenth aspect, an embodiment of this application provides a communication apparatus. The communication apparatus includes at least one processor, and the at least one processor is configured to run a computer program or instructions stored in a memory, to implement the communication method according to any one of the third aspect or the possible implementations of the third aspect.

In a possible implementation, the communication apparatuses described in the thirteenth aspect to a fifteenth aspect may further include a memory.

According to a sixteenth aspect, an embodiment of this application provides a communication apparatus. The communication apparatus includes a processor and a storage medium. The storage medium stores instructions. When the instructions are run by the processor, the communication method according to any one of the first aspect or the possible implementations of the first aspect is implemented.

According to a seventeenth aspect, an embodiment of this application provides a communication apparatus. The communication apparatus includes a processor and a storage medium. The storage medium stores instructions. When the instructions are run by the processor, the communication method according to any one of the second aspect or the possible implementations of the second aspect is implemented.

According to an eighteenth aspect, an embodiment of this application provides a communication apparatus. The communication apparatus includes a processor and a storage medium. The storage medium stores instructions. When the instructions are run by the processor, the communication method according to any one of the third aspect or the possible implementations of the third aspect is implemented.

According to a nineteenth aspect, an embodiment of this application provides a communication apparatus. The communication apparatus includes one or more modules, configured to implement the methods in the first aspect, the second aspect, and the third aspect. The one or more modules may correspond to the steps in the methods in the first aspect, the second aspect, and the third aspect.

According to a twentieth aspect, an embodiment of this application provides a chip. The chip includes a processor and a communication interface. The communication interface is coupled to the processor, and the processor is configured to run a computer program or instructions, to implement the communication method according to any one of the first aspect or the possible implementations of the first aspect. The communication interface is configured to communicate with a module other than the chip.

According to a twenty-first aspect, an embodiment of this application provides a chip. The chip includes a processor and a communication interface. The communication interface is coupled to the processor, and the processor is configured to run a computer program or instructions, to implement the communication method according to any one of the second aspect or the possible implementations of the second aspect. The communication interface is configured to communicate with a module other than the chip.

According to a twenty-second aspect, an embodiment of this application provides a chip. The chip includes a processor and a communication interface. The communication interface is coupled to the processor, and the processor is configured to run a computer program or instructions, to implement the method according to any one of the third aspect or the possible implementations of the third aspect. The communication interface is configured to communicate with a module other than the chip.

The chip provided in this embodiment of this application further includes a memory, configured to store the computer program or the instructions.

According to a twenty-third aspect, an embodiment of this application provides an apparatus, configured to perform the communication method according to any one of the first aspect or the possible implementations of the first aspect.

According to a twenty-fourth aspect, an embodiment of this application provides an apparatus, configured to perform the communication method according to any one of the second aspect or the possible implementations of the second aspect.

According to a twenty-fifth aspect, an embodiment of this application provides an apparatus, configured to perform the communication method according to any one of the third aspect or the possible implementations of the third aspect.

Any apparatus, computer storage medium, computer program product, chip, or communication system provided above is configured to perform the corresponding method provided above. Therefore, for beneficial effects that can be achieved by the apparatus, computer storage medium, computer program product, chip, or communication system provided above, refer to the beneficial effects of the corresponding solution in the corresponding method provided above. Details are not described herein again.

DESCRIPTION OF EMBODIMENTS

Figure 1:
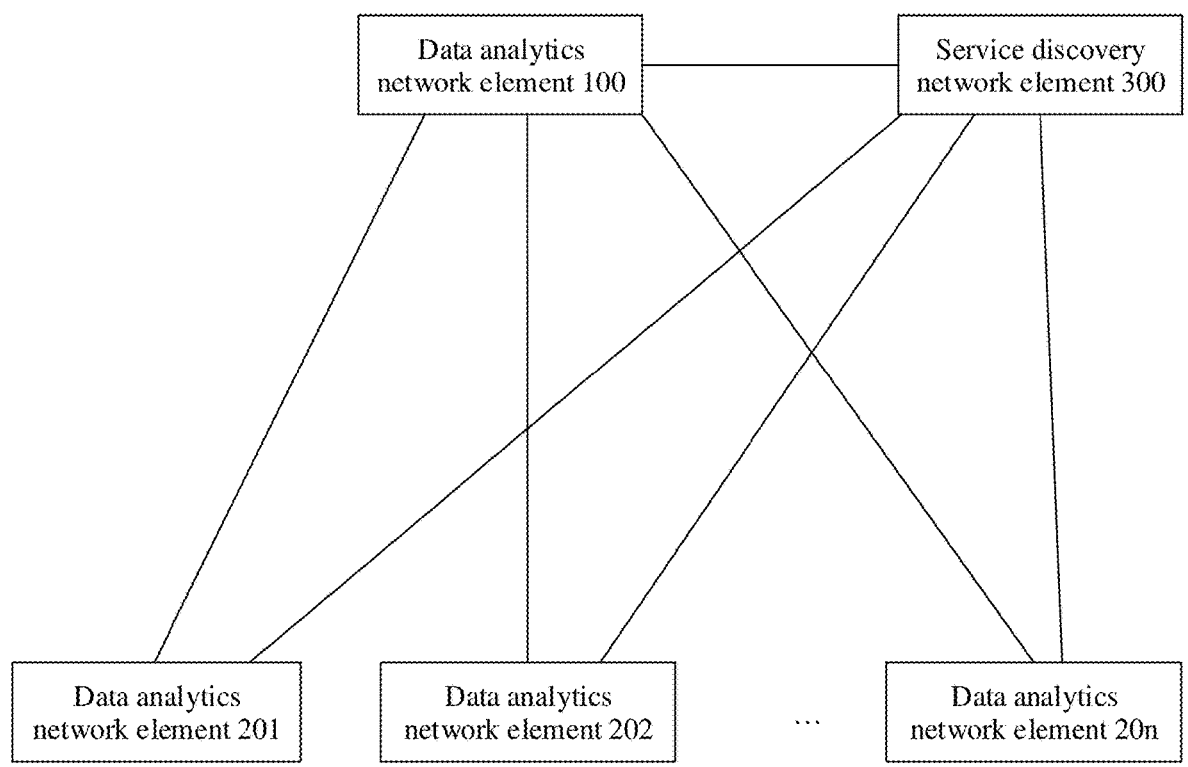
FIG. 1 is a diagram of an architecture of a communication system according to an embodiment of this application.

To clearly describe technical solutions in embodiments of this application, terms such as "first" and "second" are used in embodiments of this application to distinguish between same items or similar items that provide basically same functions or purposes. For example, first indication information and the second indication information are only used to distinguish between different indication information, and do not limit sequences of the first indication information and the second indication information. A person skilled in the art may understand that the terms such as "first" and "second" do not limit a quantity or an execution sequence, and the terms such as "first" and "second" do not indicate a definite difference. For example, a first data analytics network element may include one or more data analytics network elements, and a second data analytics network element may also include one or more data analytics network elements.

It should be noted that, in this application, the word "example", "for example", or the like is used to represent giving an example, an illustration, or a description. Any embodiment or design scheme described as an "example" or "for example" in this application should not be considered as being more preferred or having more advantages than another embodiment or design scheme. Exactly, using of the word "exemplary" or "example" or the like is intended to present a relative concept in a specific manner.

In this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

The technical solutions in embodiments of this application may be applied to various communication systems, for example, code division multiple access (CDMA), time division multiple access (TDMA), frequency division multiple access (FDMA), orthogonal frequency division multiple access (OFDMA), single carrier frequency division multiple access (SC-FDMA), and another system. Terms "system" and "network" may be interchanged with each other. Long term evolution (LTE) and various versions evolved based on LTE in 3GPP are a new version of a UMTS that uses an E-UTRA. A 5G communication system and a new radio (NR) are next-generation communication systems under research. In addition, the communication system may be further applied to a future-oriented communication technology, and are all applicable to the technical solutions provided in embodiments of this application.

FIG. 1 shows an architecture of a communication system according to an embodiment of this application. The communication system includes a data analytics network element 100, one or more data analytics network elements (for example, a data analytics network element 201 to a data analytics network element 20n) that communicate with the data analytics network element 100, and a service discovery network element 300, where n is an integer greater than or equal to 1.

The data analytics network element 100 and the one or more data analytics network elements (for example, the data analytics network element 201 to the data analytics network element 20n) each have a distributed learning capability.

For example, a type of the data analytics network element 100 or a role played by the data analytics network element 100 in distributed learning may be one or more of the following information: a server, a coordinator, a centralized trainer, and a global trainer. A type of any data analytics network element from the data analytics network element 201 to the data analytics network element 20n or a role played by any data analytics network element in distributed learning may be one or more of the following: a client, a local trainer, a distributed trainer, or a partial trainer. A deployment mode shown in FIG. 1 may be referred to as a server-client mode.

The type of the data analytics network element in this embodiment of this application may be the role played by the data analytics network element in distributed learning. For example, if the type of the data analytics network element 100 is a server, it indicates that the role played by the data analytics network element 100 in distributed learning is a server type.

In this embodiment of this application, the data analytics network element 100 may be considered as a (central) server node, and the data analytics network element 201 to the data analytics network element 20*n* may be considered as (edge) client (client) nodes.

Each of the data analytics network element 201 to the data analytics network element 20*n* has a respective range, and some or all of the data analytics network element 201 to the data analytics network element 20*n* are located within a range of the data analytics network element 100.

In this embodiment of this application, any data analytics network element may be independently deployed, or may be co-deployed with a network function network element (for example, a session management function (SMF) network element, an access and mobility management function (AMF) network element, or a policy control function (PCF) network element) in a 5G network. For example, the data analytics network element may be deployed on an existing 5GC NF based on a network element data volume or a function requirement. For example, a data analytics network element having a terminal mobility (UE Mobility or UE Moving Trajectory) analytics capability is co-deployed with the AMF network element. In this way, terminal location information on the AMF network element is not leaked from a core network, to avoid user data privacy and data security issues. In addition, for internal network element data analytics, each 5GC NF may alternatively have a built-in intelligent module (for example, a built-in NWDAF functional module), and implement a self-closed loop based on data of the 5GC NE The data analytics network element performs closed-loop control based on a data flow, only for a cross-network-element data closed loop. This is not limited in this embodiment of this application.

To avoid data leakage, original data obtained by each of the data analytics network element 201 to the data analytics network element 20*n* is distributed on each of the data analytics network element 201 to the data analytics network element 20*n*. The data analytics network element 100 may not have original data, or the data analytics network element 100 cannot collect and obtain the original data that is obtained by each of the data analytics network element 201 to the data analytics network element 20*n* and that is distributed on each of the data analytics network element 201 to the data analytics network element 20*n*, and each of the data analytics network element 201 to the data analytics network element 20*n* may not need to send the original data to the data analytics network element 100.

The data analytics network element 100 and the data analytics network element 201 to the data analytics network element 20*n* may be deployed at a granularity of inter-operator (Inter-Public Land Mobile Network, Inter-PLMN), intra-operator or inter-region (Intra-PLMN or Inter-Region), inter-network slice, intra-network slice, inter-vendor, intra-vendor, inter-data network name (data network name, DNN), or intra-DNN. In each granularity, there is a data analytics network element deployed in the server-client mode.

For example, if deployment is at a granularity of a vendor, at least one data analytics network element 100 and one or more data analytics network elements are deployed in the vendor. For example, if the deployment is at a granularity of a DNN, at least one data analytics network element 100 and one or more data analytics network elements are deployed in the DNN.

Certainly, there is also a data analytics network element deployed at a cross granularity. For example, one data analytics network element 100 is deployed in a same network slice, and one or more data analytics network elements are deployed in each of different network areas served by the network slice.

In a possible implementation, the communication system shown in FIG. 1 may be applied to a current 5G network architecture and another future network architecture. This is not specifically limited in this embodiment of this application.

The following uses an example in which the communication system shown in FIG. 1 is applicable to the 5G network architecture. For example, the communication system shown in FIG. 1 is applicable to a 5G network architecture shown in FIG. 2.

Figure 2:
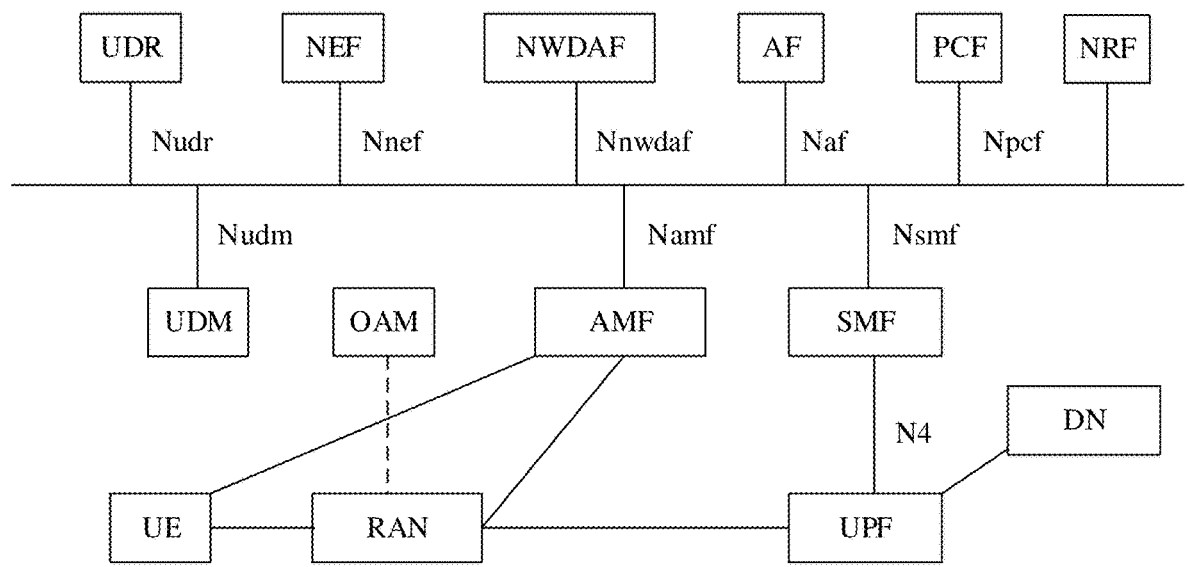
FIG. 2 is a diagram of a 5G network architecture according to an embodiment of this application.

For example, the communication system shown in FIG. 1 is applied to an interface-based architecture in the 5G network architecture. As shown in FIG. 2, a network element or an entity corresponding to any one of the data analytics network element 100 or the data analytics network element 201 to the data analytics network element 20*n* may be a network data analytics function (NWDAF) network element in the 5G network architecture shown in FIG. 2, may be a management data analytics function (MDAF) network element of a network management system, or may even be a data analytics network element or data analytics device on a RAN side.

Alternatively, a network element or an entity corresponding to any data analytics network element in this embodiment of this application may be the NWDAF network element, the MDAF network element, or a module in the data analytics network element or the data analytics device on the RAN side. This is not limited in this embodiment of this application.

Certainly, the network element or the entity corresponding to any one of the data analytics network element 100 or the data analytics network element 201 to the data analytics network element 20*n* may be a terminal shown in FIG. 2.

It should be noted that the network element or the entity corresponding to any one of the data analytics network element 100 or the data analytics network element 201 to the data analytics network element 20*n* is not limited to the terminal, the NWDAF network element, or the like. Any network element that has a model training function or supports distributed learning may be used as the data analytics network element in this embodiment of this application.

A service discovery network element 300 supports a network function or functions of registration, discovery, update, and authentication of a network service. For example, a network element or an entity corresponding to the service discovery network element 300 may be a network repository function (NRF) network element, a unified data management (UDM) network element, or a unified data repository (UDR) network element in the 5G network architecture shown in FIG. 2. Alternatively, the service discovery network element 300 may be a domain name system (DNS) server.

It should be noted that, in this embodiment of this application, an example in which the service discovery network element 300 is the NRF network element is used. In a future network, the service discovery network element 300 may be the NRF network element or have another name. This is not limited in this application.

In addition, as shown in FIG. 2, the 5G network architecture may further include the terminal, an access device (for example, an access network (AN) or a radio access network (RAN)), an application function (AF) network element, an operation, administration, and maintenance (OAM) network element, a PCF network element, an SMF network element, a user plane function (UPF) network element, a data network (DN), an AMF network element, an authentication server function (AUSF) network element, a network exposure function (NEF) network element, a UDR network element, a UDM network element, or the like. This is not specifically limited in this embodiment of this application.

The terminal communicates with the AMF network element through a next generation network (next generation, N1) interface (N1 for short). The access device communicates with the AMF network element through an N2 interface (N2 for short). The access device communicates with the UPF network element through an N3 interface (N3 for short). The UPF network element communicates with the DN through an N6 interface (N6 for short). The UPF network element communicates with the SMF network element through an N4 interface (N4 for short). The AMF network element, the AUSF network element, the SMF network element, the UDM network element, the UDR network element, the NRF network element, the NEF network element, or the PCF network element interacts with each other through a service-based interface. For example, an external service-based interface provided by the AMF network element may be Namf. An external service-based interface provided by the SMF network element may be Nsmf. An external service-based interface provided by the UDM network element may be Nudm. An external service-based interface provided by the UDR network element may be Nudr. An external service-based interface provided by the PCF network element may be Npcf. An external service-based interface provided by the NEF network element may be Nnef. An external service-based interface provided by the NRF network element may be Nnrf. An external service-based interface provided by the NWDAF network element may be Nnwdaf. It should be understood that, for related descriptions of names of various service-based interfaces in FIG. 2, refer to a diagram of a 5G system architecture in a conventional technology. Details are not described herein.

It should be understood that, an example in which some network elements (the AMF network element, the AUSF network element, the SMF network element, the UDM network element, the UDR network element, the NRF network element, the NEF network element, and the PCF network element) in a 5GC interact with each other through the service-based interface is used in FIG. 2. Certainly, the AMF network element may alternatively communicate with the SMF network element through an N11 interface (N11 for short). The AMF network element may alternatively communicate with the UDM network element through an N8 interface (N8 for short). The SMF network element may alternatively communicate with the PCF network element through an N7 interface (N7 for short). The SMF network element may alternatively communicate with the UDM network element through an N10 interface (N10 for short). The AMF network element may alternatively communicate with the AUSF network element through an N12 interface (N12 for short). The UDM network element may alternatively communicate with the UDR network element through an interface between the UDM network element and the UDR network element. The PCF network element may alternatively communicate with the UDR network element through an interface between the PCF network element and the UDR network element. This is not limited in this embodiment of this application.

The AMF network element is mainly responsible for mobility management in a mobile network, such as user location update, registration of a user with a network, and user switching.

The SMF network element is mainly responsible for session management in the mobile network, such as session establishment, modification, and release. For example, specific functions are allocation of an IP address for the user and selection of a UPF network element that provides a packet forwarding function.

The PCF network element is configured to formulate a background traffic transfer policy.

The UDM network element or the UDR network element is configured to store user data, for example, information about any data analytics network element.

The UPF network element is mainly responsible for processing a user packet, such as forwarding and charging for the user packet.

The DN refers to an operator network that provides a data transmission service for the terminal, for example, an IP multimedia service (IMS) or Internet.

The data analytics network element is a network element device that can perform big data analytics, and may be but is not limited to a network data analytics function network element. For example, the network data analytics function network element may be the NWDAF. In this embodiment of this application, the data analytics network element can perform distributed learning based training or inference.

The NRF network element supports a network function or functions of registration, discovery, update, and authentication of a network service.

An application network element may be, but is not limited to, an AF network element of the operator, a terminal, or a third-party device, for example, an AF network element of a non-operator (which may also be referred to as a third-party AF network element). The AF network element of the operator may be but is not limited to a service management and control server of the operator, and the third-party AF network element may be but is not limited to a third-party service server.

Before embodiments of this application are described, related terms in embodiments of this application are explained as follows.

Federated Learning is an emerging basic artificial intelligence technology. It is designed to implement efficient machine learning among a plurality of participants or computing nodes when ensuring information security during big data exchange, protecting terminal data and personal data privacy, and ensuring legal compliance. Cross-domain joint model training may be implemented when original data is not transmitted out of a local domain, to improve training efficiency. Most importantly, the federated learning technology may be used to avoid security problems (for example, the original data is hijacked during transmission or incorrectly used by a data center) caused by data aggregation to a data analytics center.

In detail, federated learning may be classified into the following three categories.

Horizontal federated learning (Horizontal FL, or HFL): A feature repetition rate is very high, but data samples differ from each other greatly.

Vertical federated learning (VFL): A feature repetition rate is very low, but a data sample repetition rate is high. For example, a repetition rate between a data feature from A and a data feature from B in horizontal federated learning is higher than a repetition rate between a data feature from A and a data feature from B in vertical federated learning.

Transfer learning (TL): Features and data samples differ greatly.

Figure 3:
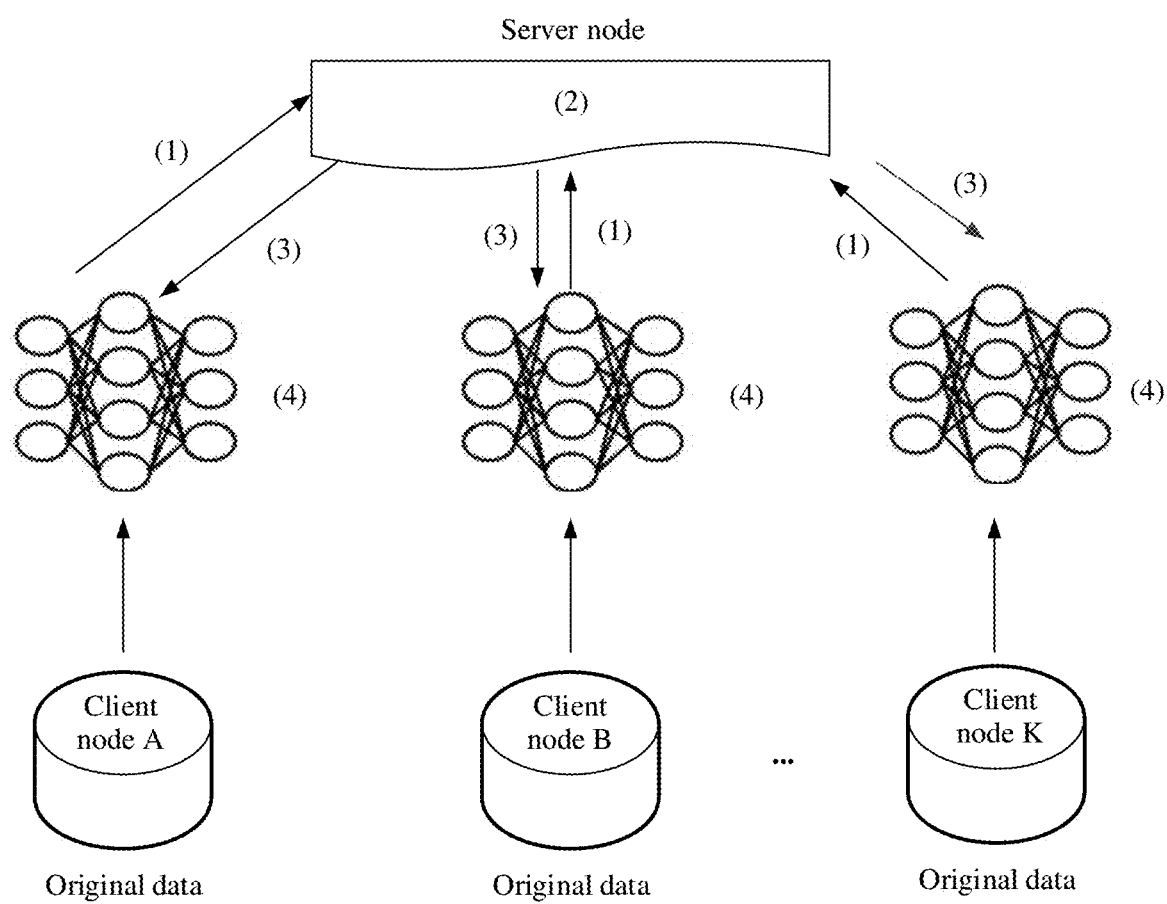
FIG. 3 is a diagram of an architecture of federated learning according to an embodiment of this application.

FIG. 3 describes a training process of horizontal federated learning according to an embodiment of this application by using linear regression as an example. It may be learned from FIG. 3 that horizontal federation includes a central server node and a plurality of edge client nodes (for example, a client node A, a client node B, and a client node C). Original data is distributed on each client node, the server node does not have the original data, and the client node is not allowed to send the original data to the server node.

First, a data set on each client node (assuming that there are K client nodes in total, in other words, there are K data sets) is as follows:

$\{x_i^A, y_i^A\}_i \in D_A, \{x_j^B, y_j^B\}_j \in D_B, \ldots, \{x_k^K, y_k^K\}_k \in D_K,$ where x is sample data, and y is label data corresponding to the sample data. In horizontal federated learning, each piece of sample data includes a label, in other words, the label and the data are stored together.

Then, a data analytics module on each client node may train, based on a linear regression algorithm, a model that is of the client and that is called a sub-model:

$h(x_i) = \Theta_A x_i^A, h(x_j) = \Theta_B x_j^B, \ldots, h(x_K) = \Theta_K x_k^K.$ It is assumed that a loss function used by linear regression is a mean square error (MSE). In this case, a target function for training each sub-model (where an entire training process is to minimize a loss function value) is:

$$\min L_I = \sum_i \|\Theta_I x_i^I - y_i^I\|^2 + \frac{\lambda}{2}\|\Theta_I\|^2, I = A, B, \ldots, K$$

The training process really starts below. For each iteration process:

(1) A sub-model gradient generated by each client node is as follows:

$$\frac{\partial L_I}{\partial \Theta_I} = \sum_i (\Theta_I x_i^I - y_i^I) x_i^I + \lambda \Theta_I, I = A, B, \ldots, K$$

(2) Each client reports a quantity of samples and a local gradient value:

$N_I$ and $$\frac{\partial L_I}{\partial \Theta_I},$$

where $N_I$ represents the quantity of samples, and $$\frac{\partial L_I}{\partial \Theta_I}$$

represents the local gradient value.

(3) After receiving the foregoing information, the server node aggregates the gradient as follows:

$$\frac{1}{\|K\|} \sum_I \frac{\partial L_I}{\partial \Theta_I} * P_I,$$

where $\|K\|$ is a quantity of client nodes $P_I = N_I / \Sigma_I N_I$.

(4) The server node delivers an aggregated gradient to each client node that participates in training, and then the client node locally updates a model parameter as follows:

$$\Theta_I := \Theta_I + \alpha \frac{1}{\|K\|} \sum_I \frac{\partial L_I}{\partial \Theta_I} * P_I, \quad I = A, B, \ldots, K$$

(5) After updating the model parameter, the client node calculates the loss function value $L_I$ and goes to step 1.

In the foregoing training process, the server node may control, based on a quantity of iterations, the training to end, for example, terminate the training when the training is performed for 10000 times, or control, by setting a threshold of the loss function, the training to end, for example, control the training to end when $L_I \leq 0.0001$.

After training ends, each client node retains a same model (which may be from the server node or may be obtained by locally personalizing based on the server node) for local inference.

Figure 4:
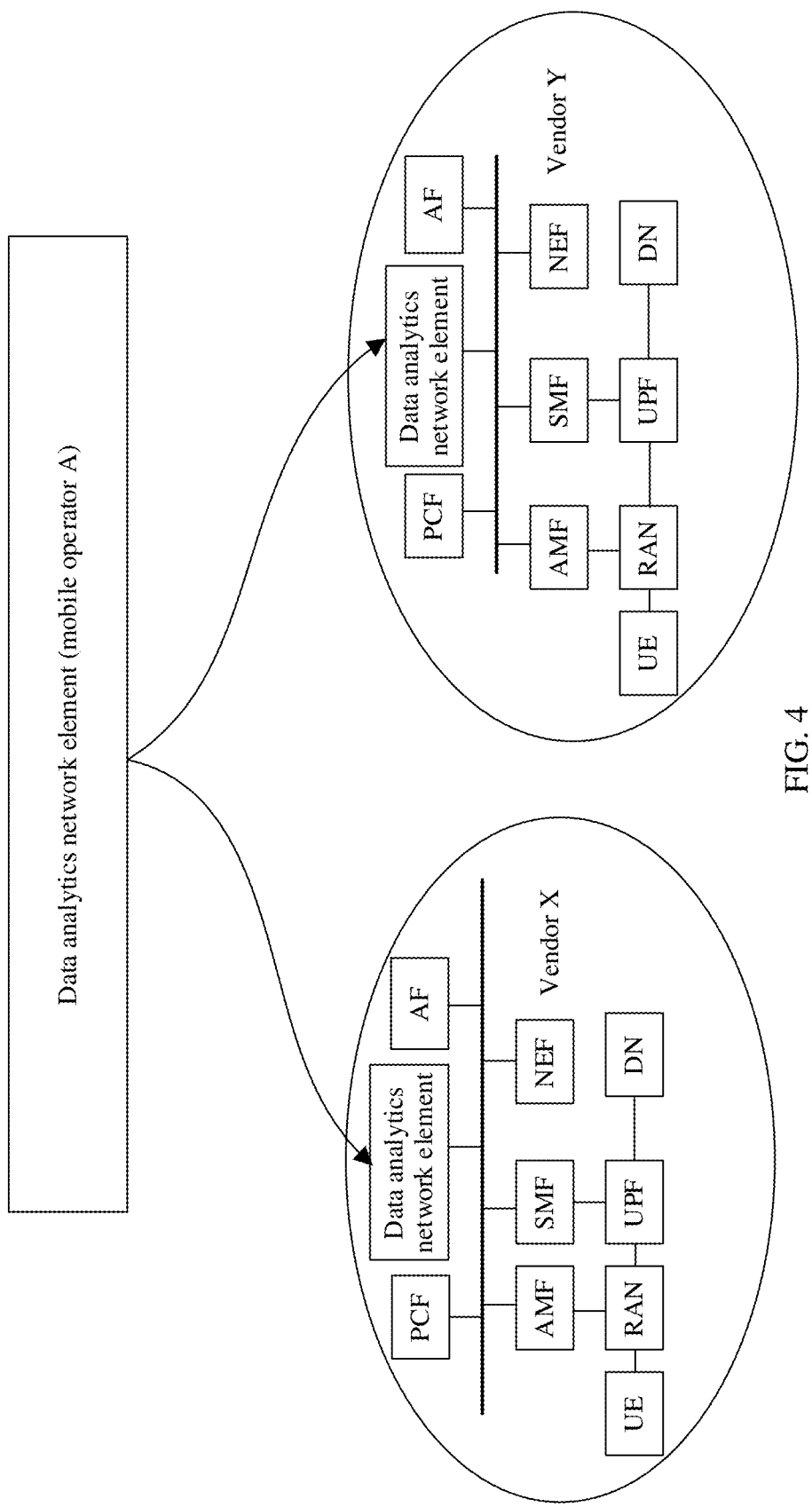
FIG. 4 is a schematic diagram of a scenario according to an embodiment of this application.

The foregoing describes the training process of horizontal federated learning. However, a current 5G network does not relate to how to apply the training process of horizontal federated learning to perform model training, especially for a scenario described in FIG. 4 or FIG. 5. For example:

Refer to FIG. 4. Scenario 1: Intra-operator and inter-vendor. For example, a mobile operator A may simultaneously purchase a device from a vendor X and a device from a vendor Y, but the device from the vendor X and the device from the vendor Y cannot directly exchange data for privacy protection. In other words, neither the device from the vendor X nor the device from the vendor Y provides data collected by each device to a data analytics network element in the mobile operator A. In this case, although the data analytics network element (for example, a Server-type data analytics network element) in the mobile operator A may train a model of an entire network by using a federated learning technology, a prerequisite for performing federated learning technology training is that the data analytics network element can accurately learn of a network element or a device that supports horizontal federated learning in devices of different vendors (for example, each vendor has a Client-type data analytics network element that provides a service for the vendor). Therefore, how the data analytics network element in the mobile operator A discovers whether the devices of different vendors support horizontal federated learning is a problem that urgently needs to be resolved.

Figure 5:
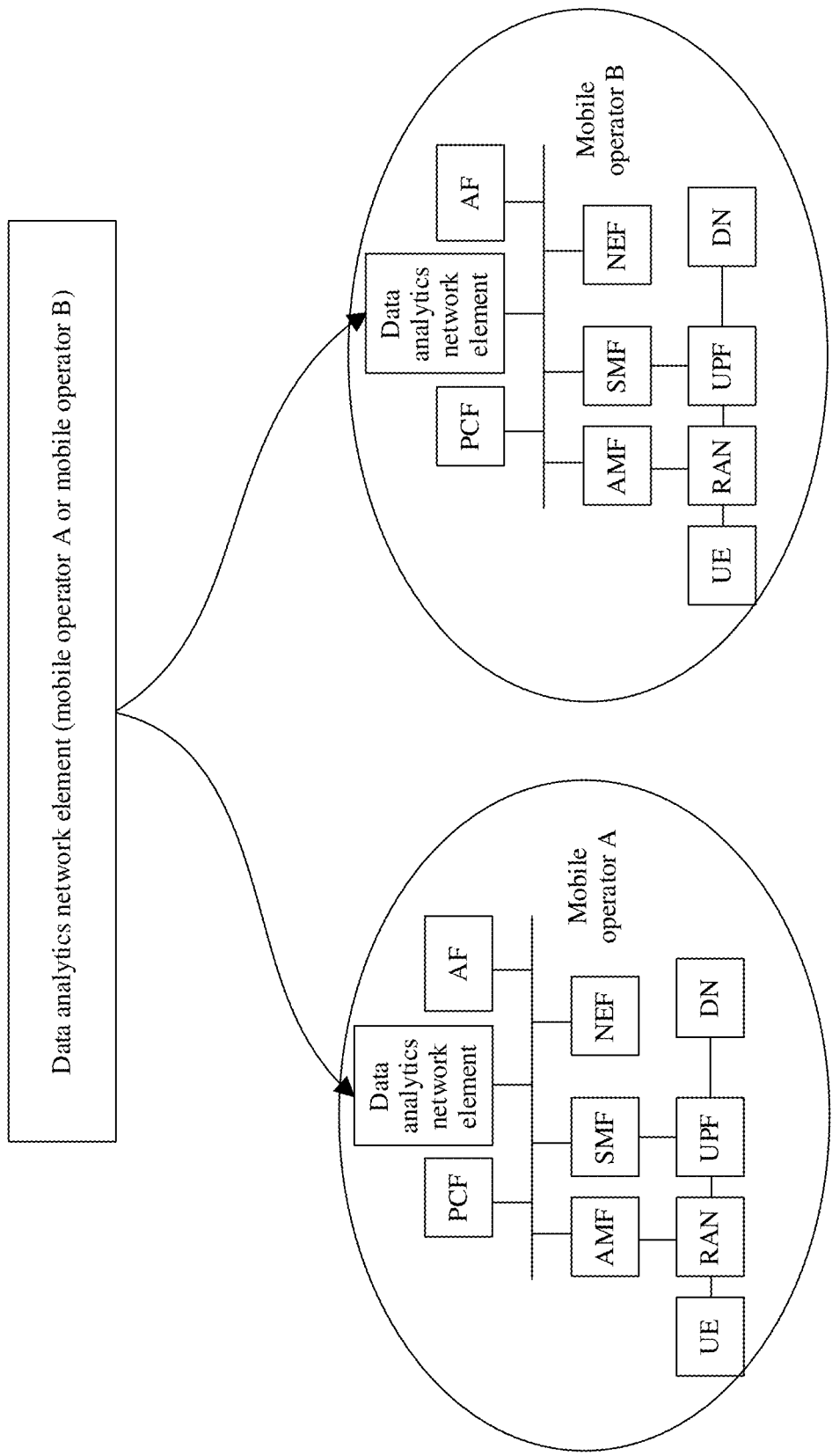
FIG. 5 is a schematic diagram of another scenario according to an embodiment of this application.

Refer to FIG. 5. Scenario 2: Inter-operator and intra-network. For example, a mobile operator A and a mobile operator B share a base station side resource (for example, a spectrum), and the two operators want to train an entire network model. Then, the mobile operator A and the mobile operator B share a data analytics result with each other. However, the mobile operator A and the mobile operator B are unwilling to report original data, and the entire network model may be obtained through training by using a federated learning technology. In conclusion, how a data analytics network element in the mobile operator A or a data analytics network element in the mobile operator B discovers whether a network element or a device of the other party supports horizontal federated learning is a problem that urgently needs to be resolved.

In another scenario in which there is no willingness to exchange the original data, for example, in a same network slice (identified by single network slice selection support information (S-NSSAI)), the original data cannot be exchanged between different network slice instances (NSIs). In a same region (for example, in China, regions include Northeast China, North China, East China, Central South China, Northwest China, and Southwest China), the original data cannot be exchanged between different cities. If each NSI in the same network slice corresponds to one data analytics network element, for example, the data analytics network element may serve the NSI, and each city in different cities in the same region may also correspond to one data analytics network element, for example, the data analytics network element may serve the city, in the same network slice, if the original data cannot be exchanged between different NSIs, or if data cannot be exchanged between different cities in the same region, the federated learning technology may be used to obtain a target model. However, a prerequisite for implementing federated learning is that a data analytics network element (a server type) can obtain information about a data analytics network element (a client type) that serves each NSI or information about a data analytics network element (a client type) that serves each city. Otherwise, horizontal federated learning cannot be performed.

Figure 6:
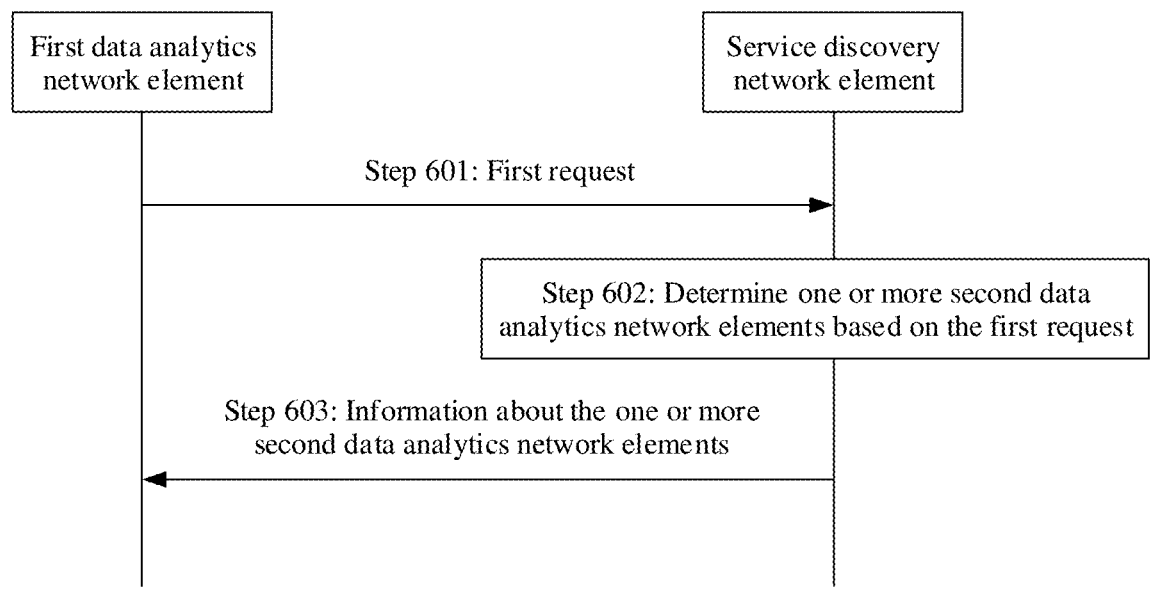
FIG. 6 is a schematic flowchart of a communication method according to an embodiment of this application.
Figure 7A:
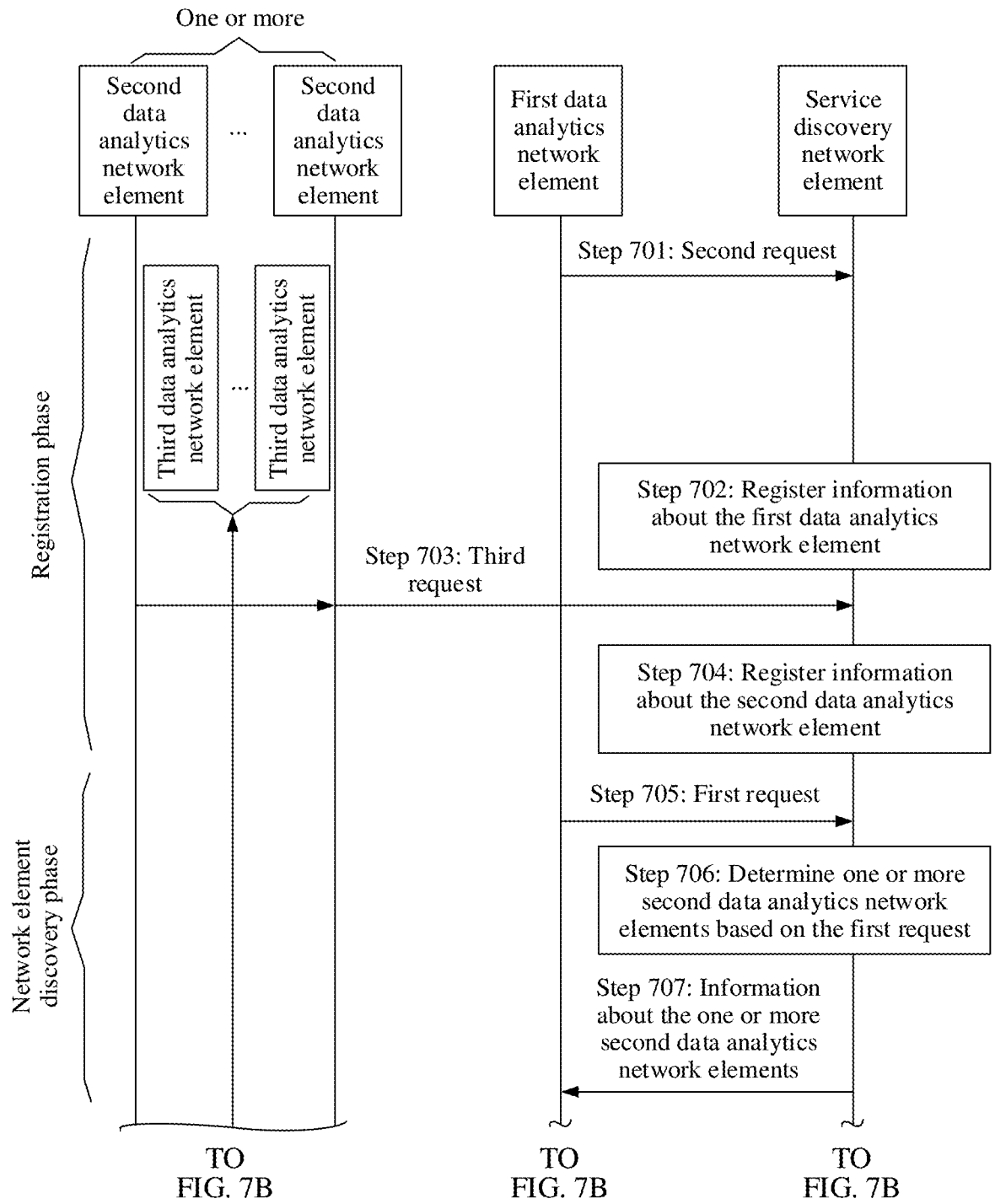
FIG. 7A and FIG. 7B each are a schematic flowchart of another communication method according to an embodiment of this application.
Figure 7B:
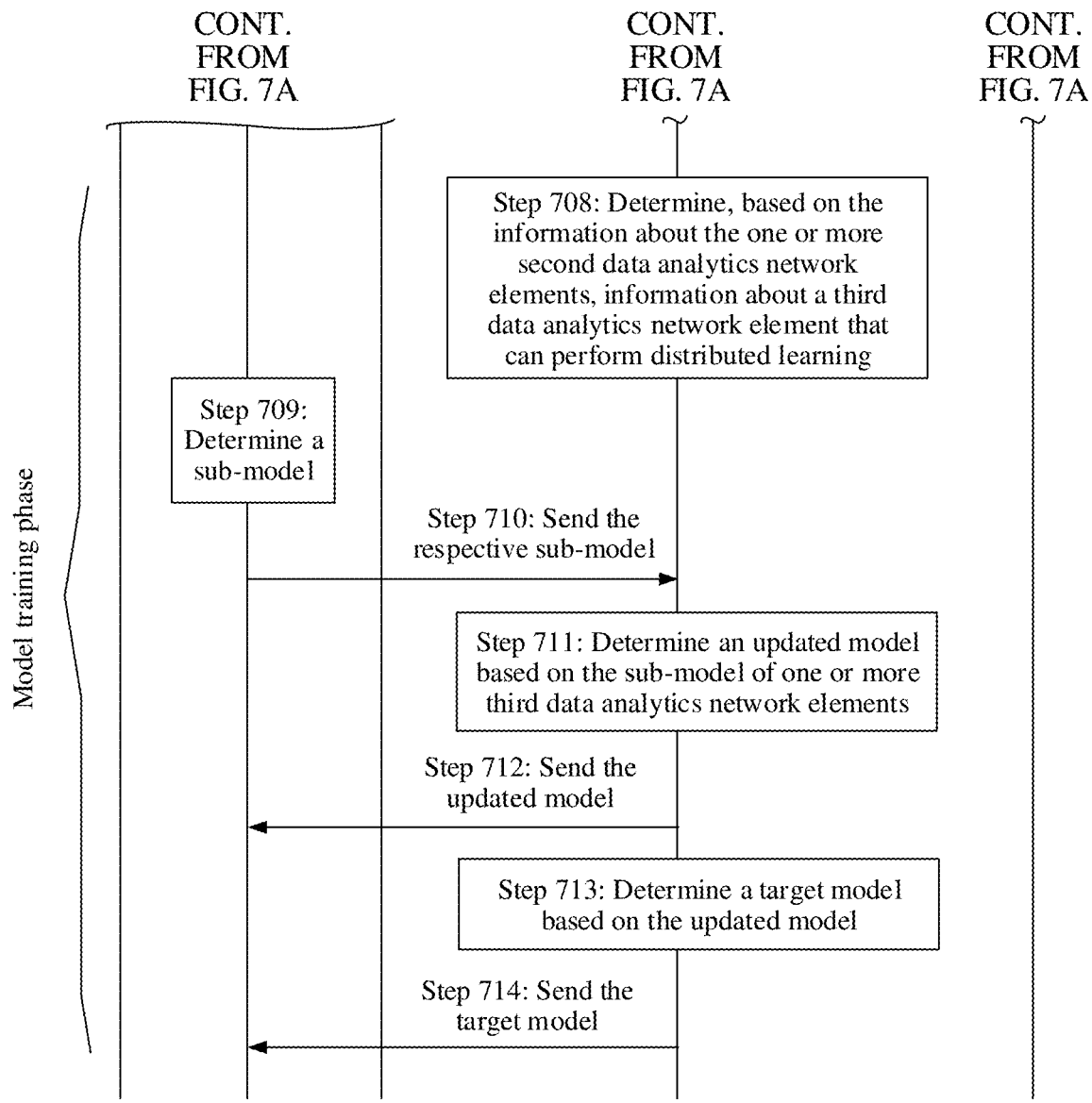

Based on this, an embodiment of this application describes a communication method with reference to FIG. 6 and FIG. 7A and FIG. 7B. By using the method, a first data analytics network element may accurately obtain information about one or more second data analytics network elements that support distributed learning.

The following describes in detail a communication method provided in embodiments of this application with reference to FIG. 1 to FIG. 5.

It should be noted that names of messages between network elements, names of parameters in the messages, or the like in the following embodiments of this application are only examples, and there may be other names in a specific implementation. This is not specifically limited in embodiments of this application.

It should be noted that mutual learning or reference may be made between embodiments of this application. For example, mutual reference may be made between same or similar steps or same or similar nouns, method embodiments, communication system embodiments, and apparatus embodiments. This is not limited.

The following describes an interaction embodiment of a communication method provided in embodiments of this application by using FIG. 6 and FIG. 7A and FIG. 7B as examples. The communication method may be performed by a first data analytics network element, or may be performed by an apparatus (for example, a chip) used in a first data analytics network element. The communication method may be performed by a second data analytics network element, or may be performed by an apparatus (for example, a chip) used in a second data analytics network element. The communication method may be performed by a service discovery network element, or may be performed by an apparatus (for example, a chip) used in a service discovery network element. The following embodiments are described by using an example in which the communication method is performed by the first data analytics network element, the second data analytics network element, and the service discovery network element. It may be understood that steps performed by the first data analytics network element may alternatively be performed by the apparatus used in the first data analytics network element, steps performed by the second data analytics network element may alternatively be performed by the apparatus used in the second data analytics network element, and steps performed by the service discovery network element may alternatively be performed by the apparatus used in the service discovery network element. Descriptions are centrally provided herein, and details are not described subsequently.

For example, an example in which the communication method provided in embodiments of this application is applied to the communication systems shown in FIG. 1 to FIG. 3 is used. FIG. 6 is a schematic interaction diagram of a communication method according to an embodiment of this application. The method includes the following steps.

Step 601: A first data analytics network element sends a first request to a service discovery network element, and correspondingly, the service discovery network element receives the first request from the first data analytics network element. The first request requests information about a second data analytics network element.

For example, the first request includes one or more of information about distributed learning and first indication information. The information about distributed learning includes a type of distributed learning, and the first indication information indicates a type of the second data analytics network element required by the first data analytics network element.

It should be understood that the type of distributed learning carried in the first request is a type of distributed learning that the second data analytics network element requested by the first data analytics network element should have.

In this embodiment of this application, an example in which distributed learning is federated learning is used. For example, the type of distributed learning includes one of horizontal learning, vertical learning, and transfer learning.

In a possible implementation, the first request may further carry fourth indication information, where the fourth indication information indicates the first data analytics network element to request the information about the second data analytics network element from the service discovery network element.

It may be understood that the second data analytics network element requested by the first data analytics network element from the service discovery network element by using the first request in step 601 in this embodiment of this application may be a general term. In this case, the first data analytics network element may not know an identifier of the second data analytics network element. The first data analytics network element includes requirement information (for example, the information about distributed learning or the first indication information) about the first data analytics network element in the first request, so that the service discovery network element provides, based on the requirement information, one or more second data analytics network elements that meet the requirement information for the first data analytics network element.

For example, the type of the second data analytics network element is one of the following: a client, a local trainer, or a partial trainer.

For example, the first data analytics network element may be the data analytics network element 100 shown in FIG. 1. The service discovery network element may be the service discovery network element 300.

Step 602: The service discovery network element determines the one or more second data analytics network elements based on the first request.

It should be understood that the one or more second data analytics network elements determined by the service discovery network element in step 602 support the type of distributed learning requested by the first data analytics network element, and/or a type of the one or more second data analytics network elements is the same as the type of the second data analytics network element indicated by the first indication information.

For example, the one or more second data analytics network elements may be all or some of the data analytics network element 201 to the data analytics network element 20n shown in FIG. 1.

For example, if the type of distributed learning carried in the first request is horizontal learning, the first data analytics network element requests a second data analytics network element that may perform horizontal learning, and the type of the second data analytics network element indicated by the first indication information is the client or the local trainer, the type of distributed learning supported by the one or more second data analytics network elements determined by the service discovery network element should be horizontal learning. In addition, in one aspect, in the one or more second data analytics network elements, a type of at least some second data analytics network elements is the client, and a type of other second data analytics network elements is the local trainer. Alternatively, in another aspect, the type of the one or more second data analytics network elements is the client or the local trainer. This is not limited in this embodiment of this application.

It may be understood that, if the type of the second data analytics network element indicated by the first indication information includes A and B, or the type of the second data analytics network element indicated by the first indication information includes A or B, the type of at least some of the one or more second data analytics network elements is A, and the type of the other second data analytics network elements is B. For example, the one or more second data analytics network elements provided by the service discovery network element for the first data analytics network element should not only include the second data analytics network elements of the type A, but should also include the second data analytics network elements of the type B.

In addition, when the type of the second data analytics network element indicated by the first indication information includes A or B, the type of the one or more second data analytics network elements may be all A or all B. For example, the type of the one or more second data analytics network elements provided by the service discovery network element for the first data analytics network element may be all B or all A. This is not limited in this embodiment of this application.

It should be understood that, that the type of the second data analytics network element indicated by the first indication information includes A and B does not mean that the type of the second data analytics network element requested by the first data analytics network element is both A and B. In other words, the second data analytics network element requested by the first data analytics network element may be one of the type A or the type B.

In an example, if the type of distributed learning includes a plurality of horizontal learning, vertical learning, and transfer learning, the one or more second data analytics network elements may include a second data analytics network element supporting horizontal learning, a second data analytics network element supporting vertical learning, and a second data analytics network element supporting transfer learning.

For example, the one or more second data analytics network elements include a data analytics network element 201, a data analytics network element 202, and a data analytics network element 203. In this case, the data analytics network element 201 may support horizontal learning, the data analytics network element 202 may support vertical learning, and the data analytics network element 203 may support transfer learning.

In another example, if the type of distributed learning includes the plurality of horizontal learning, vertical learning, and transfer learning, each of the one or more second data analytics network elements needs to support horizontal learning, vertical learning, and transfer learning.

It should be understood that the service discovery network element has at least information about the one or more second data analytics network elements, or the service discovery network element may obtain information about the one or more second data analytics network elements from another device based on the first request. The information about the one or more second data analytics network elements may be, for example, one or more of the following information corresponding to the second data analytics network element: the information about distributed learning, a range of the second data analytics network element, or second indication information, and the second indication information indicates the type of the second data analytics network element. The information about distributed learning corresponding to the second data analytics network element includes the type of distributed learning supported by the second data analytics network element and/or algorithm information of distributed learning supported by the second data analytics network element.

For example, the algorithm information supported by distributed learning in this embodiment of this application includes one or more of an algorithm type, an algorithm identifier (ID), and algorithm performance Descriptions are centrally provided herein, and details are not described subsequently.

For example, the algorithm type may be one or more of linear regression, logistic regression, a neural network, K-Means, reinforcement learning, and the like. The algorithm performance may be one or more of training time, a convergence speed, and the like. The algorithm performance is mainly used to assist a data analytics network element in selecting, during model training, an algorithm whose algorithm performance is higher than a preset algorithm threshold (for example, the training time is less than a preset time threshold or the convergence speed is higher than a preset speed threshold).

Step 603: The service discovery network element sends the information about the one or more second data analytics network elements to the first data analytics network element, and correspondingly, the first data analytics network element receives the information about the one or more second data analytics network elements from the service discovery network element.

It should be understood that types of different second data analytics network elements in the one or more second data analytics network elements may be the same or different. Types of distributed learning supported by different second data analytics network elements may be the same or different. Algorithm information of distributed learning supported by different second data analytics network elements may be the same or different. This is not limited in this embodiment of this application.

This embodiment of this application provides a communication method. In the method, the first data analytics network element sends the first request to the service discovery network element, and requests, from the service discovery network element by using the first request, a feature of the second data analytics network element required by the first data analytics network element. In this way, the service discovery network element provides, for the first data analytics network element based on the first request, the information about the one or more second data analytics network elements that support the type of distributed learning. In addition, the type of the second data analytics network element is the same as the type of the second data analytics network element requested by the first data analytics network element. In this solution, in an aspect, the first data analytics network element can find, by using the service discovery network element, a data analytics network element that can perform distributed learning based training. In another aspect, after obtaining the information about the one or more second data analytics network elements, the first data analytics network element can subsequently collaborate with the one or more second data analytics network elements to implement model training when the first data analytics network element is to perform model training, so that a data analytics application scenario can be extended.

In a possible embodiment, before step 601, the method provided in this embodiment of this application may further include: The first data analytics network element determines to trigger distributed learning based training.

In an example, that the first data analytics network element determines to trigger distributed learning based training may be implemented in the following manner: The first data analytics network element determines, based on configuration information or a manual indication, to trigger distributed learning based training.

In another example, that the first data analytics network element determines to trigger distributed learning based training may be implemented in the following manner: The first data analytics network element actively initiates distributed learning based training.

In still another example, that the first data analytics network element determines to trigger distributed learning based training may be implemented in the following manner: The first data analytics network element determines, based on a data analytics result request of a consumer function (Consumer NF) network element, to trigger distributed learning based training. For example, the Consumer NF network element is an SMF network element. If the SMF network element requests the first data analytics network element to perform service identification on a data packet flowing through a UPF network element, in this case, the first data analytics network element finds that a service identification model has not been trained, and therefore triggers distributed learning based training.

To enable the one or more second data analytics network elements provided by the service discovery network element for the first data analytics network element to meet a requirement of the first data analytics network element, in a possible embodiment, the first request further includes a range of the first data analytics network element. Correspondingly, a range of the one or more second data analytics network elements provided by the service discovery network element for the first data analytics network element falls within the range of the first data analytics network element. Step 602 in this embodiment of this application may be implemented in the following manner: The service discovery network element uses, as the one or more second data analytics network elements, one or more second data analytics network elements that are located within the range of the first data analytics network element and that support the information about distributed learning requested by the first data analytics network element. Alternatively, step 602 in this embodiment of this application may be implemented in the following manner: The service discovery network element uses, as the one or more second data analytics network elements, one or more second data analytics network elements that are located within the range of the first data analytics network element and whose type is the same as the type of the second data analytics network element indicated by the first indication information.

For example, the range of the first data analytics network element includes one or more of the following information: an area served by the first data analytics network element, a PLMN identifier to which the first data analytics network element belongs, information about a network slice served by the first data analytics network element, a data network name (DNN) served by the first data analytics network element, and device vendor information of the first data analytics network element. The information about the network slice is used to identify the network slice. For example, the information about the network slice may be single network slice selection assistance information (S-NSSAI). A range of the network slice served by the first data analytics network element may be used as the range of the first data analytics network element.

For example, the range of the second data analytics network element includes one or more of the following information: an area served by the second data analytics network element, a PLMN identifier to which the second data analytics network element belongs, a range of a network slice instance served by the second data analytics network element, a DNN served by the second data analytics network element, and device vendor information of the second data analytics network element.

In a possible embodiment, the information about distributed learning in this embodiment of this application further includes the algorithm information supported by distributed learning. Correspondingly, the one or more second data analytics network elements provided by the service discovery network element for the first data analytics network element further support the algorithm information supported by distributed learning.

It should be understood that if the information about distributed learning in the first request includes the type of distributed learning and the algorithm information supported by distributed learning, the one or more second data analytics network elements provided by the service discovery network element for the first data analytics network element should not only support the type of distributed learning, but should also support the algorithm information supported by distributed learning.

For example, if the first data analytics network element uses the first request to request the service discovery network element to search for a second data analytics network element that supports horizontal learning and whose supported algorithm type is "linear regression", the one or more second data analytics network elements provided by the service discovery network element for the first data analytics network element not only support horizontal learning, but also support the algorithm type "linear regression".

In a possible example, the information about distributed learning carried in the first request includes the type of distributed learning and the algorithm information supported by distributed learning. In another possible example, the information about distributed learning carried in the first request includes the type of distributed learning and algorithm information supported by distributed learning, and the first request further carries the range of the first data analytics network element.

FIG. 7A and FIG. 7B show another possible embodiment according to an embodiment of this application. The method includes a registration phase, a network element discovery phase, and a model training phase. The registration phase includes step 701 to step 704. The network element discovery phase includes step 705 to step 707. The model training phase includes step 708 to step 714.

Step 701: A first data analytics network element sends a second request to a service discovery network element, and correspondingly, the service discovery network element receives the second request from the first data analytics network element. The second request requests to register information about the first data analytics network element.

The information about the first data analytics network element includes one or more of the following information corresponding to the first data analytics network element: information about distributed learning, a range of the first data analytics network element, or second indication information. The second indication information indicates a type of the first data analytics network element.

The information about distributed learning corresponding to the first data analytics network element includes one or more of a type of distributed learning supported by the first data analytics network element and algorithm information supported by distributed learning supported by the first data analytics network element. For example, the second request may be a registration request message.

In a possible implementation, the second request may further include fifth indication information, and the fifth indication information requests to register the information about the first data analytics network element.

For example, the type of the first data analytics network element includes one or more of the following information: a server, a coordinator, a centralized trainer, and a global trainer.

In a possible implementation, the information about the first data analytics network element may further include an identifier of the first data analytics network element and address information of the first data analytics network element.

Step 702: The service discovery network element registers the information about the first data analytics network element.

In a possible implementation, step 702 in this embodiment of this application may be implemented in the following manner: The service discovery network element registers the information about the first data analytics network element with the service discovery network element. For example, the service discovery network element stores the information about the first data analytics network element in a storage device of the service discovery network element.

In a possible implementation, step 702 in this embodiment of this application may be implemented in the following manner: The service discovery network element sends the information about the first data analytics network element to an external storage device (for example, a UDM network element or a UDR network element). Therefore, the external storage device stores the information about the first data analytics network element. Subsequently, the service discovery network element may obtain the information about the first data analytics network element from the external storage device.

In a possible implementation, the service discovery network element in this embodiment of this application may alternatively be the UDM network element or the UDR network element. In other words, the UDM network element or the UDR network element stores the information about the first data analytics network element.

It should be noted that the first data analytics network element registers the information about the first data analytics network element with the service discovery network element. In this way, a Consumer NF network element may subsequently query, by using the service discovery network element, information about a first data analytics network element that supports distributed learning and whose type is the server or the coordinator. Then, the Consumer NF network element requests, from the first data analytics network element, to perform service identification on a data packet that flows through a UPF network element.

Step 703: The second data analytics network element sends a third request to the service discovery network element, and correspondingly, the service discovery network element receives the third request from the second data analytics network element. The third request requests to register information about the second data analytics network element.

The information about the second data analytics network element includes one or more of the following information corresponding to the second data analytics network element: information about distributed learning, a range of the second data analytics network element, or first indication information, and the first indication information indicates a type of the second data analytics network element. The information about distributed learning corresponding to the second data analytics network element may include one or more of a type of distributed learning supported by the second data analytics network element and algorithm information of distributed learning supported by the second data analytics network element.

In a possible implementation, the third request may further include sixth indication information, and the sixth indication information requests to register the information about the second data analytics network element.

In a possible implementation, the information about the second data analytics network element may further include an identifier of the second data analytics network element and address information of the second data analytics network element.

Step 704: The service discovery network element registers the information about the second data analytics network element.

For implementation of step 704, refer to the descriptions in step 702. Details are not described herein again. A difference lies in that the service discovery network element registers the information about the second data analytics network element.

It may be understood that each of the one or more second data analytics network elements may register information about each second data analytics network element with the service discovery network element.

In this embodiment of this application, step 701 and step 702 are a process in which the first data analytics network element registers the information about the first data analytics network element with the service discovery network element, step 703 and step 704 are a process in which the second data analytics network element registers the information about the second data analytics network element with the service discovery network element, and a perform sequence of step 701 and step 702 and step 703 and step 704 is not limited herein.

Information about whether to register a data analytics network element (for example, the first data analytics network element or the second data analytics network element) with the service discovery network element may be autonomously determined by the data analytics network element, or determined by a protocol, or another network element triggers the data analytics network element to perform a registration process. This is not limited in this embodiment of this application.

Step 705 to step 707 are the same as step 601 to step 603, and details are not described herein again.

In a possible embodiment, as shown in FIG. 7A and FIG. 7B, after step 707, the method provided in this embodiment of this application may further include the following steps.

Step 708: The first data analytics network element determines, based on the information about the one or more second data analytics network elements, information about a third data analytics network element that can perform distributed learning, where there is one or more third data analytics network elements.

In this embodiment of this application, the one or more third data analytics network elements may be all or some of the one or more second data analytics network elements.

For example, the one or more second data analytics network elements are the data analytics network element 201 to the data analytics network element 20n. In this case, the one or more third data analytics network elements may be a data analytics network element 201, a data analytics network element 202, and a data analytics network element 203.

The third data analytics network element meets any one of the following conditions in Example 1 to Example 3:

EXAMPLE 1

Load of the Third Data Analytics Network Element is Lower than a Preset Load Threshold It may be understood that step 708 may be implemented in the following manner: The first data analytics network element obtains load information of the one or more second data analytics network elements. The first data analytics network element determines, based on the load information of the one or more second data analytics network elements, a second data analytics network element whose load is less than the preset load threshold in the one or more second data analytics network elements as the third data analytics network element that can perform distributed learning.

EXAMPLE 2

A Priority of the Third Data Analytics Network Element is Higher than a Preset Priority Threshold It may be understood that step 708 may be implemented in the following manner: The first data analytics network element obtains one or more priorities of the one or more second data analytics network elements. The first data analytics network element determines, based on the one or more priorities of the one or more second data analytics network elements, a second data analytics network element whose priority is higher than the preset priority threshold in the one or more second data analytics network elements as the third data analytics network element that can perform distributed learning.

EXAMPLE 3

The Third Data Analytics Network Element is Located Within the Range of the First Data Analytics Network Element It may be understood that step 708 may be implemented in the following manner: The first data analytics network element obtains one or more ranges of the one or more second data analytics network elements. The first data analytics network element determines, based on the range of the one or more second data analytics network elements, a second data analytics network element that is located within the range of the first data analytics network element as the third data analytics network element that can perform distributed learning.

If the first request does not carry the range of the first data analytics network element, some of the one or more second data analytics network elements provided by the service discovery network element for the first data analytics network element may be located outside the range of the first data analytics network element, and other second data analytics network elements may be located within the range of the first data analytics network element. Therefore, after obtaining the information about the one or more second data analytics network elements, the first data analytics network element may further perform screening based on location information of each second data analytics network element to obtain one or more third data analytics network elements located within the range of the first data analytics network element.

If the first request carries the range of the first data analytics network element, the one or more second data analytics network elements provided by the service discovery network element for the first data analytics network element are located within the range of the first data analytics network element, and undoubtedly, the one or more third data analytics network elements are also located within the range of the first data analytics network element.

It should be noted that Example 1, Example 2, and Example 3 may be separately used, or may be used in combination, to serve as a condition for the first data analytics network element to determine the third data analytics network element from the one or more second data analytics network elements. When Example 1, Example 2, and Example 3 are used in combination, the load of the third data analytics network element is not only lower than the preset load threshold, but also has a priority higher than the preset priority threshold, and the third data analytics network element is also located within the range of the first data analytics network element.

Example 1 to Example 3 are only examples in which the first data analytics network element determines the third data analytics network element from the one or more second data analytics network elements. In this embodiment of this application, the first data analytics network element may alternatively determine the third data analytics network element from the one or more second data analytics network elements in another manner. This is not limited in this embodiment of this application.

Step 709: Each of the one or more third data analytics network elements determines a sub-model (Sub-Model). The sub-model determined by any third data analytics network element is obtained by the third data analytics network element through training based on data obtained by the third data analytics network element.

The data obtained by the third data analytics network element refers to data obtained by the third data analytics network element from a range of the third data analytics network element. For example, the third data analytics network element obtains terminal data (from a UE), service data (from an AF network element), network data (from a core network element, for example, an AMF network element, an SMF network element, a PCF network element, or a UPF network element), base station data (from an access network element, for example, a RAN or a gNB), and network management data (from an OAM network element) from one or more (Consumer NF) network elements within the range of the third data analytics network element. An example of the data obtained from each network element is shown in Table 1.

TABLE 1

| \multicolumn{3}{c}{Data obtained by the third data analytics network element from another network element} | | |
| --- | --- | --- |
| Data type | Network name | Description |
| Identifier of a terminal | AMF network element/SMF network element/RAN | Identifying the terminal |
| Location information | AMF network element/RAN | |
| >Time (Timestamp) | AMF network element/RAN | Time at which the terminal is in a location |
| >Location | | Location of the terminal at a corresponding time |
| Communication pattern information | SMF network element/UPF network element | |
| >Communication start time | SMF network element/UPF network element | Time at which communication between the terminal and the SMF network element starts |
| >Communication end time | | Time at which communication between the terminal and the SMF network element ends |
| >Registration time | AMF network element | Time at which the terminal registers with the AMF network element |
| >Deregistration time | | Time at which the terminal deregisters from the AMF network element |
| >Session establishment time (PDU Session Establishment Time) | SMF network element | Time at which the terminal establishes a PDU session |
| >Session modification time (PDU Session Modification Time) | | Time at which the PDU session of the terminal is modified |
| >Session release time (PDU Session release Time) | | Time at which the PDU session of the terminal is released |
| Network configuration information | SMF network element/UPF network element/RAN | |
| >(Uplink or downlink) data packet delay | SMF network element/UPF network element/RAN | Indicating an end-to-end (between the terminal and a service server or a DN) delay of an uplink or downlink data packet |
| >(Uplink or downlink) data packet size | | Indicating a size of a buffered uplink data packet or a buffered downlink data packet |
| >(Uplink or downlink) data packet quantity (UL or DL Packet Number) | | Indicating a quantity of buffered uplink data packets or buffered downlink data packets |
| >(Uplink or downlink) data packet transfer start time | | Indicating time at which transmission of an uplink data packet or a downlink data packet starts |
| >(Uplink or downlink) data packet transfer end time | | Indicating time at which transmission of an uplink data packet or a downlink data packet ends |
| >RRC connection establishment time | AMF network element/RAN | Indicating time at which a radio resource control (Radio Resource Control, RRC) connection of the terminal is established |
| >RRC connection release time | | Indicating time at which the RRC connection of the terminal is released |
| At least one piece of first-type data on the AMF network element (normalized UE behavioral data from AMF) | AMF network element | Other terminal behavior data on the AMF network element |

TABLE 1-continued

Data obtained by the third data analytics network element from another network element

| Data type | Network name | Description |
| --- | --- | --- |
| At least one piece of first-type data on the SMF network element (normalized UE behavioral data from SMF) | SMF network element | Other terminal behavior data on the SMF network element |
| At least one piece of first-type data on the UPF network element (normalized UE behavioral data from UPF) | UPF network element | Other terminal behavior data on the UPF network element |
| At least one piece of first-type data on the RAN (normalized UE behavioral data from RAN) | RAN | Other terminal behavior data on the RAN |
| UE or DE data rate | UPF network element/SMF network element | Indicating an uplink data rate or a downlink data rate of a data flow of the terminal |
| Reference signal received power (RSRP) | RAN/UE | Indicating radio channel quality RSRP of the terminal |
| Roaming Information | UE | Including one or more of roaming status indication information, a time period, a home PLMN, a visited PLMN, a home area, a visited area, a radio access technology type (RAT Type), and the like when the UE is in a roaming status. |
| Reference signal received quality (RSRQ) | RAN/UE | Indicating radio channel quality RSRQ of the terminal |
| Signal to interference plus noise ratio (SINR) | RAN/UE | Indicating radio channel quality SINR of the terminal |
| Foreground application identifier (Foreground Application ID) | UE | Foreground traffic identifier |
| Traffic data switch state (PS Data Off) | UE | Traffic switch state on network of an operator: on or off |
| Service experience | AF network element/UE | Service experience of using a service by the terminal (for example, a mean opinion score (Mean Opinion Score, MOS) of a voice service) |

It should be understood that the third data analytics network element may determine the sub-model under triggering of the first data analytics network element.

In a possible implementation, step 709 in this embodiment of this application may be implemented in the following manner Any third data analytics network element sets, based on a configuration parameter, a parameter used by the third data analytics network element to train the obtained data, and after the setting, trains, based on data (as shown in Table 1) obtained through training by a local intelligent chip (for example, a graphics processing unit (GPU)) of the third data analytics network element, to obtain the sub-model. For example, for a training process, refer to the horizontal federated training process by using the linear regression algorithm as an example in FIG. 3. A training architecture of another algorithm is similar, and details are not described herein again.

The configuration parameter in this embodiment of this application may be preconfigured in the third data analytics network element, or the configuration parameter may be provided by the first data analytics network element.

If the configuration parameter is provided by the first data analytics network element for the one or more third data analytics network elements, before step 709, the method provided in this embodiment of this application may further include: The first data analytics network element sends the configuration parameter to the one or more third data analytics network elements, and correspondingly, the one or more third data analytics network elements receive the configuration parameter from the first data analytics network element. The configuration parameter is used by the third data analytics network element to train the sub-model.

It should be noted that the first data analytics network element sends the configuration parameter to each of the one or more third data analytics network elements.

For example, the configuration parameter includes one or more of the following information: an initial model, a training set selection criterion, a feature generation method, a training termination condition, maximum training time, or maximum waiting time.

For example, the initial model includes an algorithm type and an initial model parameter. The training set selection criterion is a limitation for each feature. For example, during training of a service experience model, RSRP measured by the terminal should be limited. When an RSRP value is less than −130 dB or greater than −100 dB, corresponding sample data should be discarded. The feature generation method is a calculation method for each feature. For example, during training of the service experience model, the RSRP is to be normalized from 0 to 1. In this case, the first data analytics network element indicates the third data analytics network element to normalize RSRP, for example, normalize a maximum value and a minimum value. Training termination condition: For example, a maximum quantity of iterations. Training is terminated when the quantity of iterations reaches a maximum quantity of iterations. For another example, a maximum loss function value. The loss function decreases in each round of iterative training, and the training may be terminated when the loss function decreases to a required maximum loss function value. The maximum training time is used to indicate maximum time of each round of iterative training. When time of one round of iterative training exceeds the maximum training time, an entire federated training process may be affected. Therefore, the first data analytics network element limits time of each round of iterative training performed on the third data analytics network element. The maximum waiting time is used to indicate maximum time at which the first data analytics network element waits for the third data analytics network element to feed back the sub-model during each round of iterative training. If the time at which the first data analytics network element waits for the third data analytics network element to feed back the sub-model during one round of iterative training exceeds the maximum waiting time, the entire federated training process may be affected. Therefore, the first data analytics network element limits the time of each round of iterative training performed on the third data analytics network element.

Note: A transmission time is further required for transmitting the sub-model from the third data analytics network element to the first data analytics network element. Therefore, the maximum waiting time includes the maximum training time and the transmission time.

Step 710: The one or more third data analytics network elements send respective sub-models to the first data analytics network element, and correspondingly, the first data analytics network element receives the sub-models from the one or more third data analytics network elements.

Step 711: The first data analytics network element determines an updated model based on the sub-model of the one or more third data analytics network elements.

It should be understood that the first data analytics network element may obtain an updated model by aggregating the sub-model provided by each third data analytics network element.

For example, the one or more third data analytics network elements are the data analytics network element 201, the data analytics network element 202, and the data analytics network element 203. A sub-model provided by the data analytics network element 201 is a sub-model 1, a sub-model provided by the data analytics network element 202 is a sub-model 2, and a sub-model provided by the data analytics network element 203 is a sub-model 3. In this case, the first data analytics network element may aggregate the sub-model 1, the sub-model 2, and the sub-model 3 to obtain the updated model.

Step 712: The first data analytics network element sends the updated model to the one or more third data analytics network elements, and correspondingly, each of the one or more third data analytics network elements may obtain the updated model from the first data analytics network element.

It should be understood that, after obtaining the updated model, the third data analytics network element may perform a next round of iterative training, to obtain a sub-model corresponding to the next round of iteration. In other words, after step 712 is performed, step 709 is performed cyclically until the training termination condition indicated by the configuration parameter is met.

It should be understood that, if the maximum quantity of iterations in the training termination condition is N, the third data analytics network element may perform N rounds of iterative training, and in each round of iterative training, the third data analytics network element sends a sub-model obtained through training to the first data analytics network element in a current round of iteration training.

In a possible embodiment, after step 712, the method provided in this embodiment of this application may further include:

Step 713: The first data analytics network element determines a target model based on the updated model.

For example, step 713 in this embodiment of this application may be implemented in the following manner: If determining that a set maximum quantity of federated training times (which may also be referred to as a maximum quantity of iterations) is reached, the first data analytics network element determines the updated model as the target model. In other words, when the maximum quantity of training times is reached, the first data analytics network element determines the updated model as the target model.

It should be noted that the maximum quantity of federated training times is a quantity of times in which the first data analytics network element aggregates the sub-models. The maximum quantity of iterations in the training termination condition is a quantity of iterations in a process in which the third data analytics network element generates the sub-model before reporting the sub-model each time.

Step 714: The first data analytics network element sends, to the one or more second data analytics network elements, the target model and one or more of the following information corresponding to the target model: a model identifier (model ID), a model version identifier (Version ID), or a data analytics identifier (analytics ID).

In some embodiments, before step 714, the method may further include: The first data analytics network element allocates the model identifier, the model version identifier, or the data analytics identifier for the target model.

Figure 8:
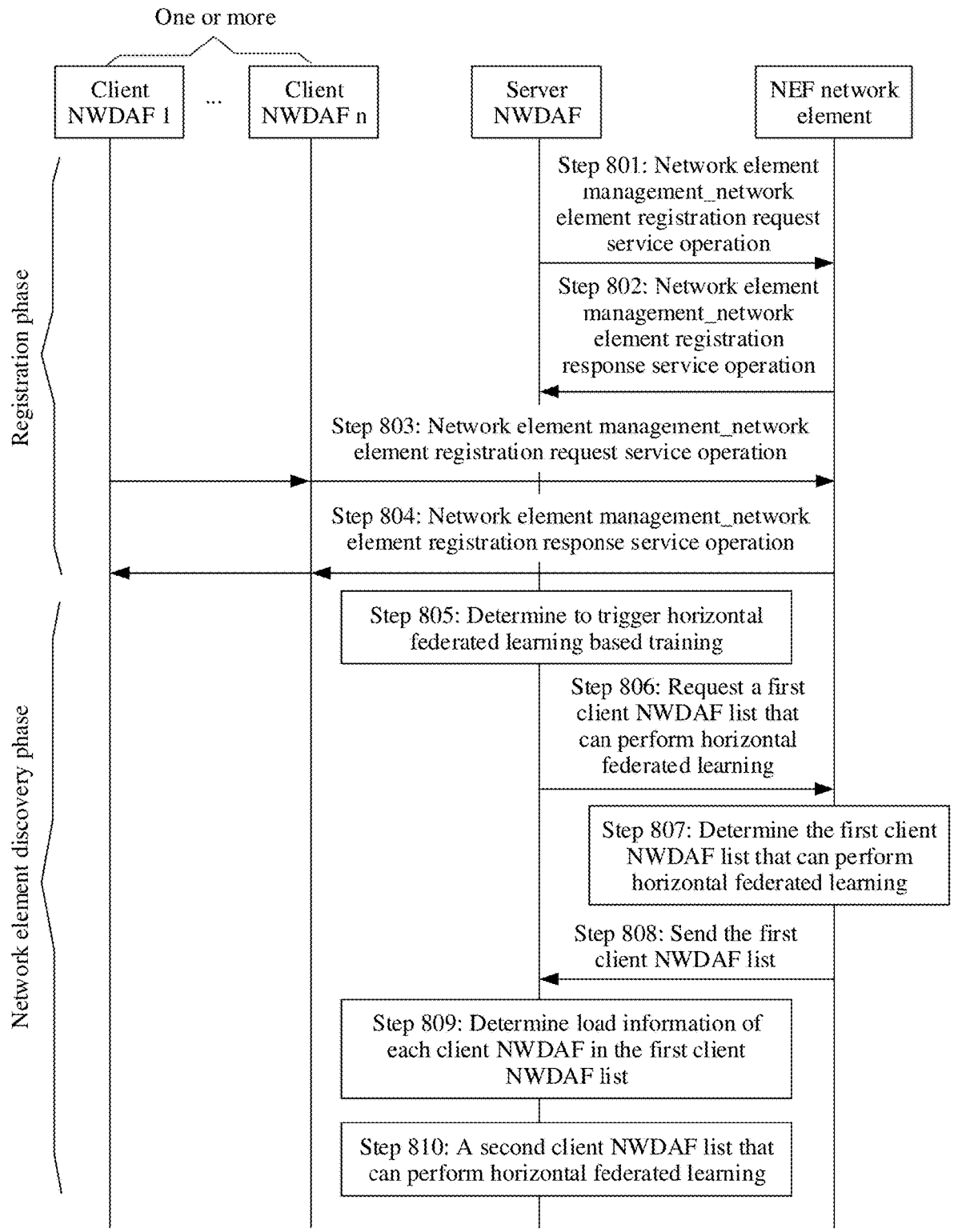
FIG. 8 is a detailed embodiment of a communication method according to an embodiment of this application.

FIG. 8 shows a detailed embodiment of a communication method according to an embodiment of this application by using an example in which a type of a first data analytics network element is a server, the first data analytics network element may be referred to as a server NWDAF, a type of a second data analytics network element is a client, the second data analytics network element may be referred to as a client NWDAF, a service discovery network element is an NRF network element, and a type of distributed learning is horizontal federated learning. The method includes the following steps.

Step 801: The server NWDAF triggers a network element management_network element registration request service operation (Nnrf_NFManagement_NFRegister Request) to the NRF network element, and correspondingly, the NRF network element receives the network element management network element registration request service operation from the server NWDAF.

The network element management network element registration request service operation requests to register information about the server NWDAF with the NRF network element. The information about the server NWDAF includes one or more of the following information: network element basic information, a range of the server NWDAF, federated learning capability information, or second indication information.

It may be understood that, after receiving the information about the server NWDAF, the NRF network element stores the information about the server NWDAF, to complete registration of the information about the server NWDAF.

In a possible implementation, the network element management_network element registration request service operation may carry indication information that indicates to register the information about the server NWDAF with the NRF network element.

Step 802: The NRF network element triggers a network element management_network element registration response service operation (Nnrf_NFManagement_NFRegister Response) to the server NWDAF, and correspondingly, the server NWDAF receives the network element management_network element registration response service operation from the NRF network element.

The network element management_network element registration response service operation indicates that the NRF network element has successfully registered the information about the server NWDAF with the NRF network element. In a possible implementation, the network element management_network element registration response service operation carries a successful registration indication, and the successful registration indication indicates that the NRF network element has successfully registered the information about the server NWDAF with the NRF network element.

Step 803: The client NWDAF triggers the network element management_network element registration request service operation to the NRF network element, and correspondingly, the NRF network element receives the network element management_network element registration request service operation from the client NWDAF.

The network element management_network element registration request service operation requests to register information about the client NWDAF with the NRF network element. For example, the information about the client NWDAF includes one or more of the following information: basic information about the client NWDAF, a range of the client NWDAF, federated learning capability information of the client NWDAF, or third indication information.

The basic information about the client NWDAF may be a type of the client NWDAF, an identifier of the client NWDAF (for example, a client NWDAF ID), a location of the client NWDAF, or address information of the client NWDAF.

It may be understood that, after receiving the information about the client NWDAF, the NRF network element stores the information about the client NWDAF, to complete registration of the information about the client NWDAF.

In a possible implementation, the network element management_network element registration request service operation may carry indication information that indicates to register the information about the client NWDAF with the NRF network element.

Step 804: The NRF network element triggers a network element management_network element registration response service operation (Nnrf_NFManagement_NFRegister Response) to the client NWDAF, and correspondingly, the client NWDAF receives the network element management_network element registration response service operation from the NRF network element.

The network element management_network element registration response service operation indicates that the NRF network element has successfully registered the information about the client NWDAF with the NRF network element. In a possible implementation, the network element management_network element registration response service operation carries a successful registration indication, and the successful registration indication indicates that the NRF network element has successfully registered the information about the client NWDAF with the NRF network element.

Step 805: The server NWDAF determines to trigger horizontal federated learning based training.

For implementation of step 805, refer to the foregoing process in which the first data analytics network element determines to trigger distributed learning based training. Details are not described herein.

Step 806: The server NWDAF requests, from the NRF network element, a first client NWDAF list that can perform horizontal federated learning.

In an example, step 806 in this embodiment of this application may be implemented in the following manner: The server NWDAF triggers a network element discovery request (Nnrf_NFDiscovery_Request) to the NRF network element, and correspondingly, the NRF network element receives the network element discovery request from the server NWDAF. The network element discovery request requests, from the NRF network element, the first client NWDAF list that can perform horizontal federated learning.

For example, the network element discovery request includes the range of the server NWDAF and first indication information.

It may be understood that the first indication information indicates, to the NRF network element, a type of a client NWDAF or an algorithm performance requirement that is required by the server NWDAF.

In a possible implementation, the network element discovery request carries indication information y, where the indication information y indicates to request, from the NRF network element, the first client NWDAF list that can perform horizontal federated learning.

Step 807: The NRF network element determines the first client NWDAF list that can perform horizontal federated learning. The first client NWDAF list includes information about each client NWDAF in a client NWDAF 1 to a client NWDAF n.

Figure 10:
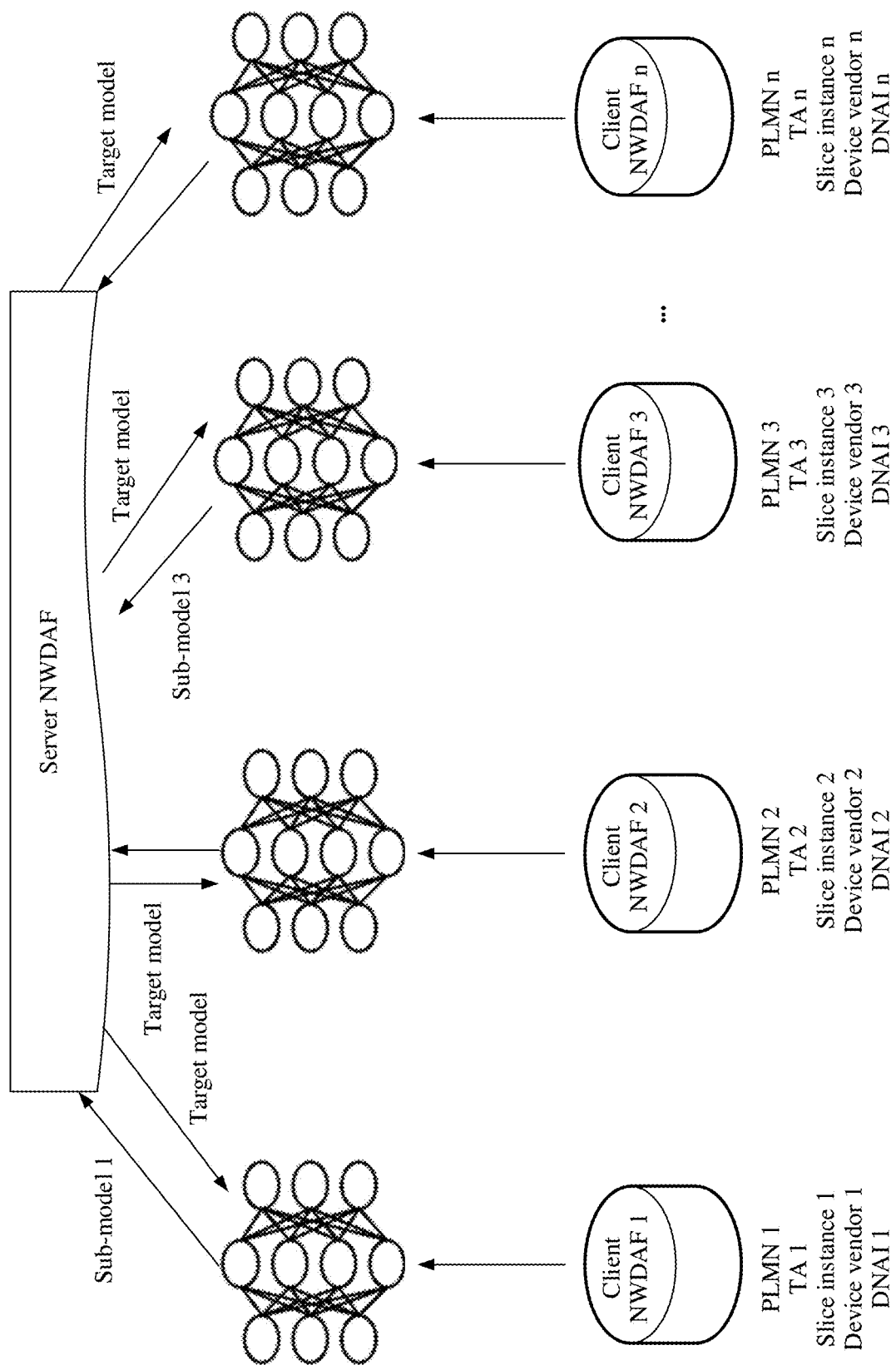
FIG. 10 is a schematic diagram of an architecture of model training according to an embodiment of this application.

For example, as shown in FIG. 10, a PLMN corresponding to the client NWDAF 1 is a PLMN 1, a TA is a TA 1, a slice instance is a slice instance 1, a device vendor of the client NWDAF 1 is a device vendor 1, a DNAI of the client NWDAF 1 is a DNAI 1, a PLMN corresponding to a client NWDAF 2 is a PLMN 2, the TA is a TA 2, the slice instance is a slice instance 2, and a device vendor of the client NWDAF 2 is a device vendor 2, and a DNAI of the client NWDAF 2 is DNAI 2. By analogy, the information about each client NWDAF is obtained.

Step 808: The NRF network element sends the first client NWDAF list to the server NWDAF, and correspondingly, the server NWDAF receives the first client NWDAF list from the NRF network element.

It may be understood that the first client NWDAF list includes one or more client NWDAFs that meet a requirement of the server NWDAF.

In a possible implementation, step 808 may be implemented in the following manner: The NRF network element sends a network element discovery response to the server NWDAF, where the network element discovery response includes the first client NWDAF list.

It may be understood that, before step 808, the method provided in this embodiment of this application may further include: The NRF network element queries, based on the request of the server NWDAF on the NRF network element, the client NWDAF 1 to the client NWDAF n that meet the request of the server NWDAF, to obtain the first client NWDAF list.

Step 809: The server NWDAF determines load information of each client NWDAF in the first client NWDAF list.

In a possible implementation, step 808 in this embodiment of this application may be implemented in the following manner: The server NWDAF queries, from an OAM network element, the NRF network element, or an NWDAF that can analyze the load information of the client NWDAF, the load information of each client NWDAF in the first client NWDAF list.

For example, the load information of the client NWDAF corresponds to one or more of the following information:

Status (registered, suspended, and undiscoverable);

NF resource usage (for example, a central processing unit (CPU), a memory, and hard disk);

NF load (Load, an actual value, an average value, or variance); and

NF peak load.

It may be understood that the load information of the client NWDAF in step 808 may alternatively be replaced with a priority of the client NWDAF.

Step 810: The server NWDAF determines, based on the load information of each client NWDAF, a second client NWDAF list that can perform horizontal federated learning.

The second client NWDAF list includes information about all or some of client NWDAFs in a client NWDAF 1 to a client NWDAF n.

In an implementation, step 810 in this embodiment of this application may be implemented in the following manner Load of a client NWDAF included in the second client NWDAF list is less than a preset load threshold.

For example, the server NWDAF sorts the first client NWDAF list in ascending order of Load, and then selects a client NWDAF whose Load is less than the preset load threshold to perform horizontal federated learning. An objective of this action is to ensure that the selected client NWDAF has abundant resources for training a sub-model, to improve training efficiency of entire federated learning.

In an alternative implementation, step 810 in this embodiment of this application may be replaced in the following manner: The server NWDAF determines, based on a priority of each client NWDAF, the second client NWDAF list that can perform horizontal federated learning. In this case, the priority of the client NWDAF included in the second client NWDAF list is higher than a preset priority threshold.

In an implementation, each client NWDAF has a corresponding priority, and algorithm performance of a client NWDAF with a high priority is higher than algorithm performance of a client NWDAF with a low priority, or algorithm performance of a client NWDAF with a high priority is higher than a preset algorithm performance threshold. Alternatively, load of a client NWDAF with a high priority is lower than load of a client NWDAF with a low priority, or load of a client NWDAF with a high priority is lower than the preset load threshold. An algorithm performance evaluation indicator of the client NWDAF with the high priority is higher than an algorithm performance evaluation indicator of the client NWDAF with the low priority, or an algorithm performance evaluation indicator of the client NWDAF with the high priority meets a preset algorithm performance evaluation indicator threshold. The algorithm performance evaluation indicator may include a square error, accuracy, a recall rate, and an F-Score (an average score obtained after the accuracy and the recall are reconciled).

In the embodiment shown in FIG. 8, the server NWDAF or the client NWDAF registers the federated capability information that the server NWDAF or the client NWDAF has with the NRF network element, to assist a 5G network (for example, the server NWDAF) in finding, by using the NRF network element, a proper client NWDAF for federated training if horizontal federated learning is to be performed.

The network element management_network element registration request service operation in step 801 in the embodiment shown in FIG. 8 corresponds to the foregoing second request. The network element management_network element registration request service operation in step 803 corresponds to the foregoing third request. A coverage range of the server NWDAF may correspond to the range of the first data analytics network element in the foregoing embodiments. The range of the client NWDAF may correspond to the range of the second data analytics network element in the foregoing embodiments. The network element discovery request in step 806 corresponds to the first request in the foregoing embodiments. The client NWDAF 1 to the client NWDAF n correspond to the one or more second data analytics network elements in the foregoing embodiments. All client NWDAFs included in the second client NWDAF list correspond to the one or more third data analytics network elements in the foregoing embodiments.

Figure 9A:
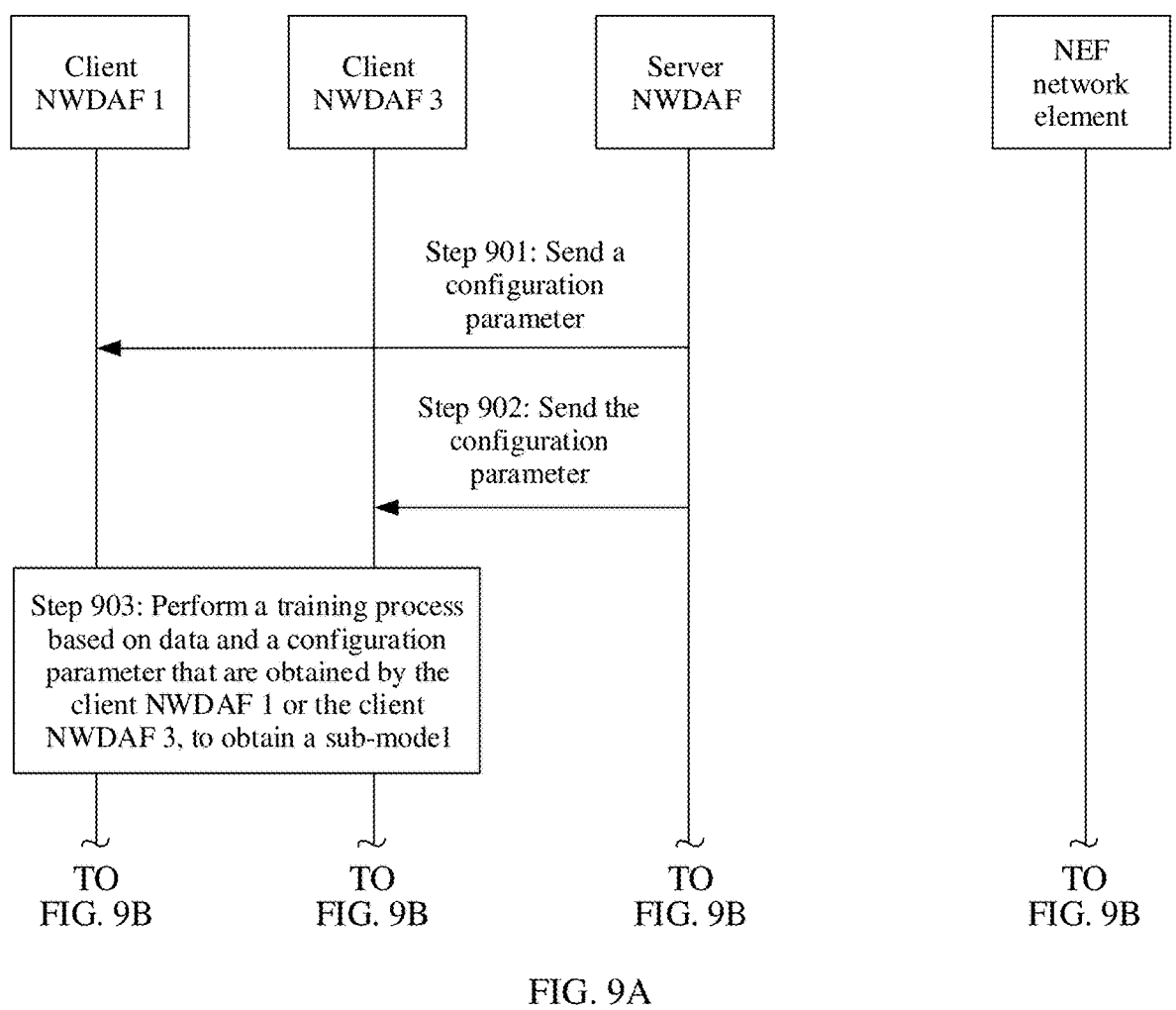
FIG. 9A and FIG. 9B each are a detailed embodiment of another communication method according to an embodiment of this application.
Figure 9B:
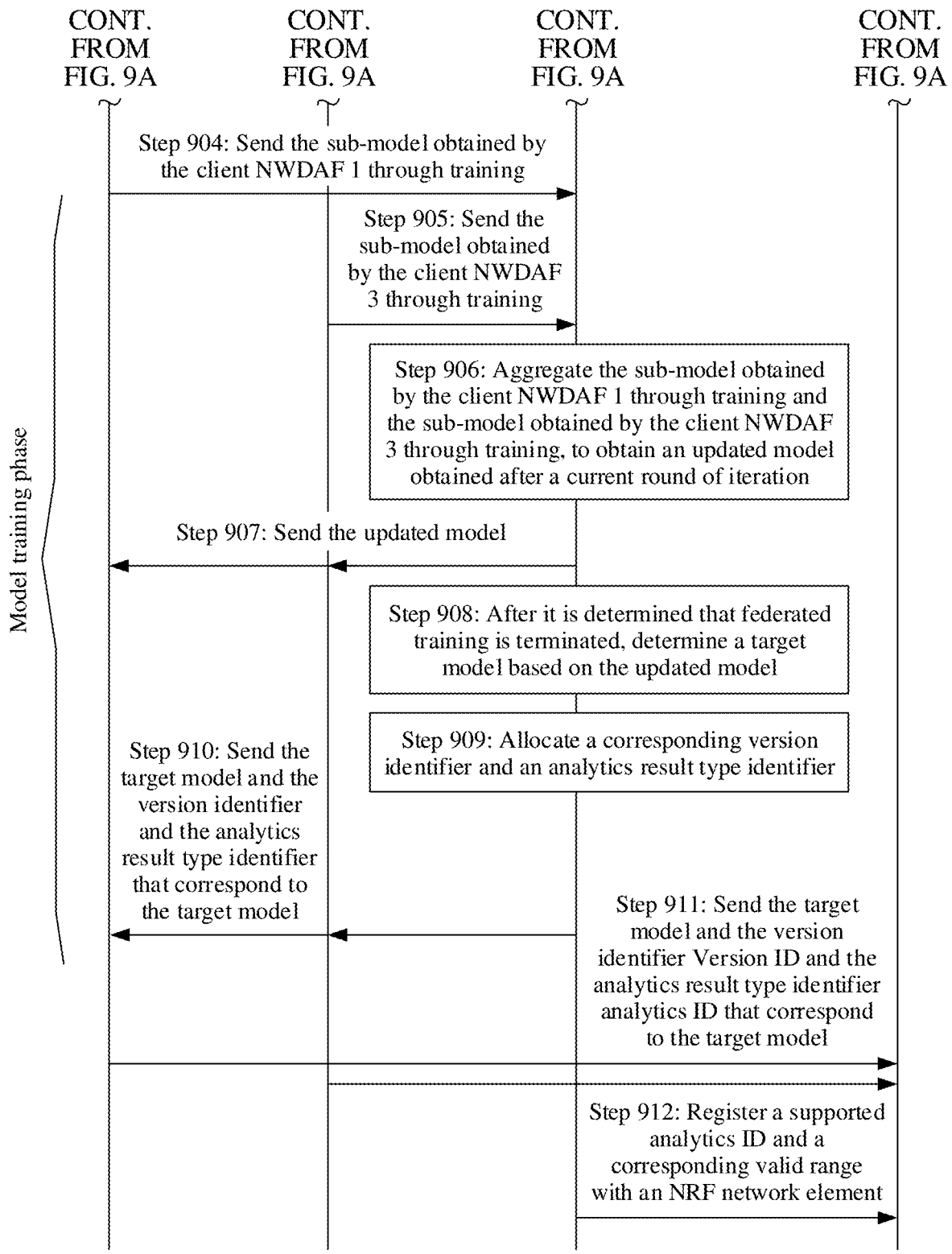

FIG. 9A and FIG. 9B show an embodiment of a model training method according to an embodiment of this application. In the method, an example in which a server NWDAF determines that clients NWDAFs that perform horizontal federated training are a client NWDAF 1 and a client NWDAF 3 is used. The method includes the following steps.

Step 901: The server NWDAF sends a configuration parameter to the client NWDAF 1, and correspondingly, the client NWDAF 1 receives the configuration parameter from the server NWDAF. The configuration parameter is a parameter used by the client NWDAF 1 to train a sub-model.

For example, step 901 may be implemented in the following manner: The server NWDAF triggers an Nnwdaf_HorizontalFL_Create request service operation to the client NWDAF 1, and correspondingly, the client NWDAF 1 receives the Nnwdaf_HorizontalFL_Create request service operation from the server NWDAF.

The Nnwdaf_HorizontalFL_Create request service includes the configuration parameter. For example, for content of the configuration parameter, refer to the descriptions in the foregoing embodiments. Details are not described herein again.

Step 902: The server NWDAF sends the configuration parameter to the client NWDAF 3, and correspondingly, the client NWDAF 3 receives the configuration parameter from the server NWDAF. The configuration parameter is a parameter used by the client NWDAF 3 to train a sub-model.

It may be understood that, after receiving the configuration parameter, the client NWDAF 3 or the client NWDAF 1 may further send a response indication to the server NWDAF, where the response indication indicates that the client NWDAF successfully configures the parameter used by the client NWDAF to train the sub-model.

Step 903: The client NWDAF 1 or the client NWDAF 3 performs a training process based on data that is obtained by the client NWDAF 1 or the client NWDAF 3 and the configuration parameter, to obtain a sub-model.

It may be understood that, in each sub-model reporting process of the client NWDAF 1 or the client NWDAF 3, the client NWDAF 1 or the client NWDAF 3 may perform a plurality of rounds of sub-iteration training internally. Each round of sub-iteration training corresponds to a maximum quantity of sub-iterations. The client NWDAF 1 or the client NWDAF 3 may use, as the sub-model, a model obtained when the maximum quantity of sub-iterations corresponding to each round of sub-iteration training is reached.

Step 904: The client NWDAF 1 sends, to the server NWDAF, the sub-model obtained by the client NWDAF 1 through training.

For example, the client NWDAF 1 triggers an Nnwdaf_HorizontalFL_Update request service operation to the server NWDAF, to send, to the server NWDAF, the sub-model obtained by the client NWDAF 1 through training.

Step 905: The client NWDAF 3 sends, to the server NWDAF, the sub-model obtained by the client NWDAF 3 through training.

For example, the client NWDAF 3 triggers the Nnwdaf_HorizontalFL_Update request service operation to the server NWDAF, to send, to the server NWDAF, the sub-model obtained by the client NWDAF 3 through training.

The sub-model may be a black box, and is sent to the server NWDAF as a model file. The sub-model may further be defined, including an algorithm type, a model parameter, and the like.

In a possible implementation, after providing, to the server NWDAF, the sub-model obtained through respective training, the client NWDAF 1 or the client NWDAF 3 may further request an updated model from the server NWDAF.

As shown in FIG. 10, the client NWDAF 3 sends, to the server NWDAF, a sub-model 3 obtained by the client NWDAF 3 through training, and the client NWDAF 1 sends, to the server NWDAF, a sub-model 1 obtained by the client NWDAF 1 through training.

Step 906: The server NWDAF aggregates the sub-model obtained by the client NWDAF 1 through training and the sub-model obtained by the client NWDAF 3 through training, to obtain an updated model after a current round of iteration.

Step 907: The server NWDAF sends the updated model to the client NWDAF 1 and the client NWDAF 3.

It may be understood that each client NWDAF performs a plurality of rounds of iterative training, and each client NWDAF in each round of iterative training obtains, through training, a sub-model corresponding to a current round of iterative training. After the sub-model is obtained through each round of iteration training, each client NWDAF reports, to the server NWDAF, the sub-model corresponding to the current round of iteration training.

Step 903 to step 907 may be cyclically performed until a training termination condition set when the client NWDAF 1 and the client NWDAF 3 perform sub-model training is met.

Step 908: After determining that federated training is terminated, the server NWDAF determines a target model based on the updated model.

Step 909: The server NWDAF may allocate a version identifier (Version ID) and/or an analytics result type identifier (analytics ID) corresponding to the target model (which is referred to as Trained Model, Global Model, or Optimal Model).

Step 910: The server NWDAF sends the target model, the version identifier and the analytics result type identifier corresponding to the target model, to all or some client NWDAFs within a range of the server NWDAF.

For example, the server NWDAF triggers an Nnwdaf_HorizontalFL_Update Acknowledge service operation to all or some client NWDAFs within the range of the server NWDAF, to send the target model and the version identifier Version ID and the analytics result type identifier analytics ID that correspond to the target model to all or some client NWDAFs within the range of the server NWDAF.

As shown in FIG. 10, the server NWDAF sends, to the client NWDAF 1 to a client NWDAF n, the target model and at least one of the model identifier Model ID, the version identifier Version ID, and the analytics result type identifier analytics ID that correspond to the target model.

It should be noted that, although during model training, the client NWDAF 1 and the client NWDAF 3 within the range of the server NWDAF participate in training, and another client NWDAF other than the client NWDAF 1 and the client NWDAF 3 in the range of the server NWDAF does not participate in training, the another client NWDAF may still share the target model.

Step 911: The client NWDAF 1 and the client NWDAF 3 send, to an NEF network element, the target model and at least one of the model identifier Model ID, the version identifier Version ID, and the analytics result type identifier analytics ID that correspond to the target model.

For example, the client NWDAF 1 and the client NWDAF 3 separately trigger an Nnrf_NFManagement_NFRegister_request service operation to an NRF network element to register the analytics ID, the version ID, and a valid range (an area, a time period, and the like) corresponding to the target model, to notify the NRF network element that the client NWDAF 1 and the client NWDAF 3 support analytics of the analytics ID.

Note: In this step, the valid range corresponding to the analytics ID is determined by each client NWDAF based on data participating in target model training. For another client NWDAF and another server NWDAF, data participating in training is unknown.

Step 912: The server NWDAF registers the supported analytics ID and the corresponding valid range with the NRF network element.

In this embodiment of this application, the valid range corresponding to the analytics ID in step 912 includes a valid range of the analytics ID on the client NWDAF.

The analytics ID supported by the server NWDAF is also registered with the NRF network element. This is applicable to a scenario where the NWDAF is deployed in layers. It is assumed that a third-party AF network element or an OAM network element requests, from a network side NWDAF, a data analytics result corresponding to the analytics ID in a large area. In this case, the AF network element or the OAM network element first queries the server NWDAF from the NRF network element. Then the server NWDAF may separately request a sub-area data analytics result from another client NWDAF, and then sends the sub-area data analytics result to the AF network element or the OAM network element after integration.

In the embodiment shown in FIG. 9A and FIG. 9B, a federated learning based training process is introduced to a 5G network, so that data does not need to be transmitted out of a local domain of each client NWDAF participating in federated learning based training. Each client NWDAF participating in federated learning based training performs sub-model training based on obtained data, and then each client NWDAF participating in federated learning based training provides a sub-model obtained in each round of training for a server NWDAF, so that the server NWDAF finally obtains an updated model through aggregation based on the sub-model, then, the target model is obtained, so that a model training process is performed. In this method, data leakage can be avoided, and because data training is performed by the client NWDAF, distributed training process can also accelerate an entire model training speed.

Figure 11:
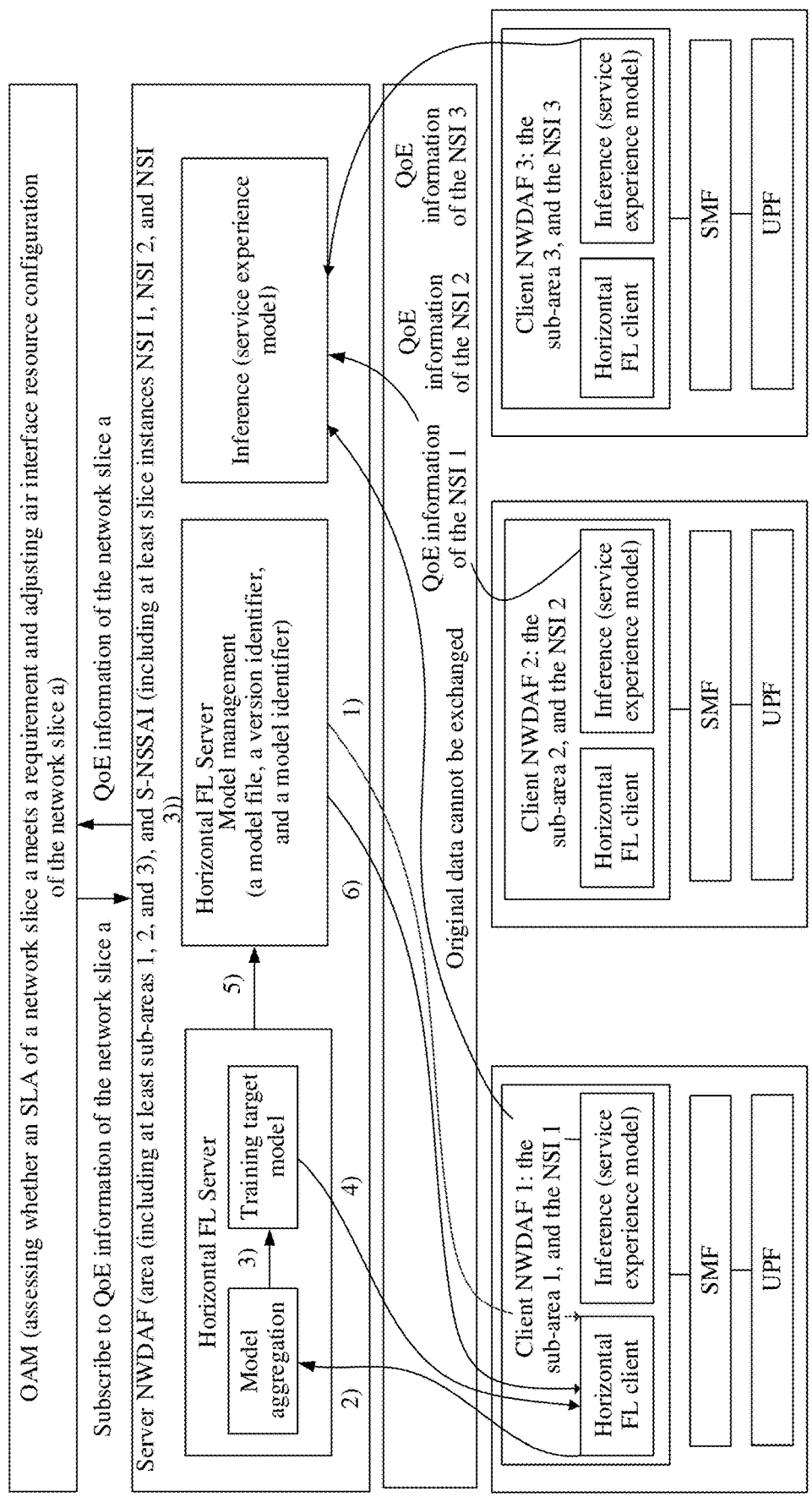
FIG. 11 is another schematic diagram of an architecture of model training according to an embodiment of this application.

As shown in FIG. 11, for a network slice a whose S-NSSAI is of a type A, a server NWDAF may be deployed to provide a service for the network slice a, and then at least one client NWDAF is deployed in different areas served by the network slice a or on different slice instances corresponding to the network slice a. As shown in FIG. 11, the network slice a serves an area 1, an area 2, and an area 3, and slice instances: a slice instance (network slice instance, NSI) 1, an NSI 2, and an NSI 3 are deployed in the network slice a. A client NWDAF 1 is deployed in the area 1, or a client NWDAF 1 serves the NSI 1. A client NWDAF 2 is deployed in the area 2, or a client NWDAF 2 serves the NSI 2. The client NWDAF 3 is deployed in the area 3, or a client NWDAF 3 serves the NSI 3.

In an NWDAF information registration process, the server NWDAF registers information such as a supported NWDAF type (for example, a server), supported federated learning capability information (a horizontal federated learning type and algorithm information), and supported analytics ID=Service Experience data analytics with an NRF network element. The client NWDAF 1 to the client NWDAF 3 register information such as an NWDAF type (for example, a client), federated learning capability information (a horizontal federated learning type and algorithm information), and analytics ID=aervice experience data analytics that are supported by the client NWDAF 1 to the client NWDAF 3 with the NRF network element. Refer to the registration process in step 801 to step 804. For example, the client NWDAF 1, the client NWDAF 2, and the client NWDAF 3 support Horizontal FL and are of the client type.

Then, OAM triggers a subscription request to the server NWDAF, where the subscription request is used to subscribe quality of experience (QoE) of a service or service experience (service experience, service mean opinion score, or service MOS) of the network slice a. Based on triggering of the subscription request from the OAM, the server NWDAF queries, based on a type, a range, federated learning capability information supported by the required client NWDAF, and analytics ID=Service Experience by using the NRF network element, a client NWDAF list that can perform horizontal federated learning, and screens, from the client NWDAF list, a target client NWDAF (for example, the client NWDAF 1, the client NWDAF 2, and the client NWDAF 3) whose Load is lower than a load threshold to participate in horizontal federated training.

In a federated learning preparation phase, the server NWDAF first determines that a relationship model between service experience and network data that is to be determined through linear regression. A service experience (Service MOS) model may be represented as follows:

$$h(x)=w_0x_0+w_1x_1+w_2x_2+w_3x_3+w_4x_4+w_5x_5+\ldots+w_Dx_D$$

where $h(x)$ indicates the service experience, namely, Service MOS, as shown in Table 2;

$x_i(i=0,1,2,\ldots,D)$ indicates the network data, as shown in Table 3; and

D is a dimension of the network data, $w_i(i=0, 1, 2, \ldots, D)$ is a weight of each piece of network data that affects the service experience, and D is a dimension of a weight.

TABLE 2

Service data from an AF network element

| Data | Data source | Description |
|---|---|---|
| Application identifier (application ID) | AF network element | Used to identify a service |
| IP filter information | AF network element | IP quintuple, used to indicate a service data flow of the service |
| Location of application | AF network element/NEF network element | One or more DNAIs, used to identify an access point of the service. |
| Service experience | AF network element | Service experience of the service data flow |
| Timestamp | AF network element | Time of the service data flow |

TABLE 3

Network data from a 5G NF

| Data | Data source | Description |
|---|---|---|
| Timestamp | 5GC NF network element | Time when the following data is collected |
| Location | AMF network element | Terminal location |
| DNN | SMF network element | DNN of a PDU session to which a QoS flow belongs |
| S-NSSAI | SMF network element | S-NSSAI of the PDU session to which the QoS flow belongs |
| application ID | SMF network element | Application identifier corresponding to the QoS flow |
| IP filter information | SMF network element | IP quintuple corresponding to a service in the QoS flow |
| QoS flow identifier (QFI) | SMF network element | QoS flow identifier |
| QoS flow bit rate | UPF network element | Observed uplink or downlink bit rate/bandwidth of the QoS flow |
| QoS flow packet delay | UPF network element | Uplink or downlink packet delay of an observed QoS flow |
| Quantity of transmitted packets of the QoS flow (packet transmission) | UPF network element | Quantity of transmitted packets of the observed QoS flow |

TABLE 3-continued

Network data from a 5G NF

| Data | Data source | Description |
| --- | --- | --- |
| Quantity of times of packet retransmission of the QoS flow (packet retransmission) | UPF network element | Quantity of times of packet retransmission of the observed QoS flow |
| Reference signal received power (RSRP) | OAM network element | Terminal air interface measurement quantity: RSRP |
| Reference signal received quality (RSRQ) | OAM network element | Terminal air interface measurement quantity: RSRQ |
| signal to interference plus noise ratio (SINR) | OAM network element | UE air interface measurement quantity: SINR |

In a training phase:

(1) The server NWDAF first determines an initial Service MOS model based on history, and then delivers the initial Service MOS model, a data type (which is also referred to as a feature), algorithm type linear regression, a maximum quantity of iterations that correspond to each $x_i$(i=0, 1, 2, ..., D), and the like to the client NWDAF 1 to the client NWDAF 3 participating in training.

(2) Each of the client NWDAF 1 to the client NWDAF 3 calculates a gradient of a respective loss function of the client NWDAF 1 to the client NWDAF 3 for $w_i$(i=0, 1, 2, ..., D), and the gradient may be referred to as the sub-model or a client NWDAF training intermediate result in this embodiment of this application. Then, the client NWDAF 1 to the client NWDAF 3 report, to the server NWDAF, sub-models obtained through training and quantities of samples (in other words, quantities of service flows in Table 2 and Table 3) participating in training.

(3) The server NWDAF may perform, by using a model aggregation module in the server NWDAF, weighted average aggregation on sub-models reported by all target clients NWDAF participating in horizontal federated training, to obtain an updated model.

(4) The server NWDAF sends the updated model to each of the client NWDAF 1 to the client NWDAF 3 that participate in the horizontal federation training. Then, the client NWDAF 1 to the client NWDAF 3 update local parameters based on the updated model. When any one of the client NWDAF 1 to the client NWDAF 3 determines that a quantity of iterations reaches a maximum quantity of sub-iterations, the client NWDAF terminates training, and continues to send, to the server NWDAF, a sub-model obtained when the maximum quantity of iteration times is reached.

(5) When determining that the termination condition of federated training is met (for example, the foregoing (2) to (4)), the server NWDAF obtains the target model based on the updated model, and then the model management module in the server NWDAF allocates one or more of the identifier of the target model, the version identifier of the target model, and the analytics ID corresponding to the service QoE in the network slice a to the target model.

(6) The server NWDAF sends the target model and one or more of the target model, the version identifier of the target model, and the Analytics ID to each of the client NWDAF 1 to the client NWDAF 3.

In an inference phase:

A. It is assumed that, to optimize resource configuration of the network slice a, the OAM subscribes to service QoE information of the network slice a from the server NWDAF.

B. The server NWDAF requests the service QoE information in each corresponding sub-area or slice instance from each of the managed client NWDAF 1 to the managed client NWDAF 3.

C. The client NWDAF 1 sends service QoE information of a sub-area 1 or an NSI 1 to the server NWDAF, the client NWDAF 2 sends service QoE information of a sub-area 2 or an NSI 2 to the server NWDAF, and the client NWDAF 3 sends service QoE information of a sub-area 3 or an NSI 3 to the server NWDAF. Then, the server NWDAF summarizes service QoE information of all sub-areas or slice instances to obtain the service QoE information of the network slice a, and sends the service QoE information to the OAM.

For example, the client NWDAF 1 obtains the service QoE information of the area 1 or the NSI 1 based on the target model and data corresponding to the area 1 or the NSI 1. The client NWDAF 2 obtains the service QoE information of the area 2 or the NSI 2 based on the target model and data corresponding to the area 2 or the NSI 2. The client NWDAF 3 obtains the service QoE information of the area 3 or the NSI 3 based on the target model and data corresponding to the area 3 or the NSI 3.

D. The OAM determines, based on the service QoE information of the network slice a, whether SLA of the network slice a is met. If the SLA of the network slice a is not met, the SLA of the network slice a may be met by adjusting an air interface resource, a core network resource, or a transmission network configuration of the network slice a.

The foregoing mainly describes the solutions in embodiments of this application from a perspective of interaction between network elements. It may be understood that, to implement the foregoing functions, the network elements such as the first data analytics network element, the service discovery network element, and the third data analytics network element include corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional unit division may be performed based on the first data analytics network element, the service discovery network element, and the third data analytics network element in the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in embodiments of this application, division into the units is an example, and is only a logical function division. In actual implementation, another division manner may be used.

The foregoing describes the methods in embodiments of this application with reference to FIG. 6 to FIG. 11. The following describes a communication apparatus that is provided in an embodiment of this application and that performs the foregoing methods. A person skilled in the art may understand that the method and the apparatus may be mutually combined and referenced. The communication apparatus provided in this embodiment of this application may perform the steps performed by the first data analytics network element, the service discovery network element, and the third data analytics network element in the foregoing communication methods.

Figure 12:
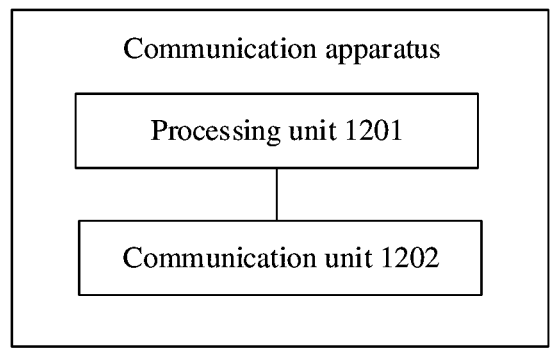
FIG. 12 is a schematic diagram of a structure of a communication apparatus according to an embodiment of this application.

FIG. 12 shows a communication apparatus in the foregoing embodiments. The communication apparatus may include a communication unit 1202 and a processing unit 1201. The processing unit 1201 is configured to support the communication apparatus in performing an information processing action. The communication unit 1202 is configured to support the communication apparatus in performing an information receiving or sending action.

In an example, the communication apparatus is a first data analytics network element, or a chip used in a first data analytics network element. In this case, the communication unit 1202 is configured to support the communication apparatus in performing a sending action performed by the first data analytics network element in step 601 in FIG. 6 in the foregoing embodiments. The communication unit 1202 is configured to support the communication apparatus in performing a receiving action performed by the first data analytics network element in step 603 in FIG. 6. The processing unit is further configured to support the communication apparatus in performing a processing action performed by the first data analytics network element in the foregoing embodiments.

In a possible embodiment, the communication unit 1202 is further configured to support the communication apparatus in performing sending actions performed by the first data analytics network element in step 701, step 712, and step 714 in the foregoing embodiments. The processing unit 1201 is further configured to support the communication apparatus in performing step 708, step 711, and step 713 in the foregoing embodiments.

In another example, the communication apparatus is a third data analytics network element, or a chip used in a third data analytics network element. In this case, the processing unit 1201 is configured to support the communication apparatus in performing a processing action performed by the third data analytics network element in step 709 in the foregoing embodiments. The communication unit 1202 is configured to support the communication apparatus in performing a sending action performed by the third data analytics network element in step 710 in the foregoing embodiments.

In a possible implementation, the communication unit 1202 is further configured to support the communication apparatus in performing a receiving action performed by the third data analytics network element in step 712, a receiving action performed by a second data analytics network element in step 714, and a sending action performed by the second data analytics network element in step 703 in the foregoing embodiments.

In still another example, the communication apparatus is a service discovery network element, or a chip used in a service discovery network element. In this case, the communication unit 1202 is configured to support the communication apparatus in performing a receiving action performed by the service discovery network element in step 601 in FIG. 6 in the foregoing embodiments. The processing unit 1201 is further configured to support the communication apparatus in performing a processing action performed by the service discovery network element in step 602 in the foregoing embodiments. The communication unit 1202 is configured to support the communication apparatus in performing a sending action performed by the service discovery network element in step 603 in FIG. 6.

In a possible embodiment, the communication unit 1202 is further configured to support the communication apparatus in performing receiving actions performed by the service discovery network element in step 701 and step 703 in the foregoing embodiments. The processing unit 1201 is configured to support the communication apparatus in performing processing actions performed by the service discovery network element in step 702 and step 704 in the foregoing embodiments.

Figure 13:
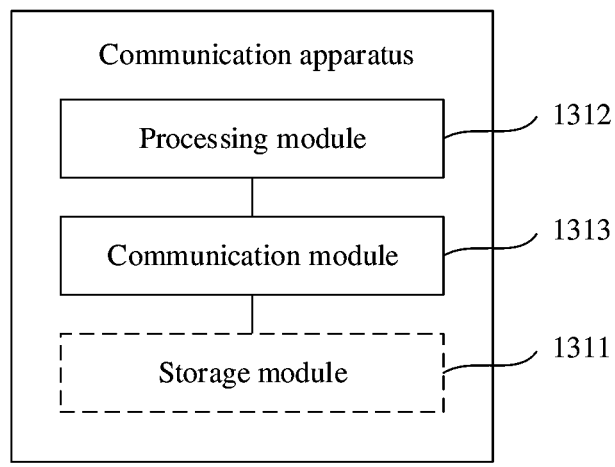
FIG. 13 is a schematic diagram of a structure of another communication apparatus according to an embodiment of this application.

FIG. 13 is a possible schematic diagram of a logical structure of a communication apparatus in the foregoing embodiments. The communication apparatus includes a processing module 1312 and a communication module 1313. The processing module 1312 is configured to control and manage an action of the communication apparatus. For example, the processing module 1312 is configured to perform an information/data processing step performed by the communication apparatus. The communication module 1313 is configured to support the communication apparatus in performing an information/data sending or receiving step.

In a possible embodiment, the communication apparatus may further include a storage module 1311, configured to store program code and data of the communication apparatus.

In an example, the communication apparatus is a first data analytics network element, or a chip used in a first data analytics network element. In this case, the communication module 1313 is configured to support the communication apparatus in performing a sending action performed by the first data analytics network element in step 601 in FIG. 6 in the foregoing embodiments. The communication module 1313 is configured to support the communication apparatus in performing a receiving action performed by the first data analytics network element in step 603 in FIG. 6. The processing module is further configured to support the communication apparatus in performing a processing action performed by the first data analytics network element in the foregoing embodiments.

In a possible embodiment, the communication module 1313 is further configured to support the communication apparatus in performing sending actions performed by the first data analytics network element in step 701, step 712, and step 714 in the foregoing embodiments. The processing module 1312 is further configured to support the communication apparatus in performing step 708, step 711, and step 713 in the foregoing embodiments.

In another example, the communication apparatus is a third data analytics network element, or a chip used in a third data analytics network element. In this case, the processing module 1312 is configured to support the communication apparatus in performing a processing action performed by the third data analytics network element in step 709 in the foregoing embodiments. The communication module 1313 is configured to support the communication apparatus in performing a sending action performed by the third data analytics network element in step 710 in the foregoing embodiments.

In a possible implementation, the communication module 1313 is further configured to support the communication apparatus in performing a receiving action performed by the third data analytics network element in step 712, a receiving action performed by a second data analytics network element in step 714, and a sending action performed by the second data analytics network element in step 703 in the foregoing embodiments.

In still another example, the communication apparatus is a service discovery network element, or a chip used in a service discovery network element. In this case, the communication module 1313 is configured to support the communication apparatus in performing a receiving action performed by the service discovery network element in step 601 in FIG. 6 in the foregoing embodiments. The processing module 1312 is further configured to support the communication apparatus in performing a processing action performed by the service discovery network element in step 602 in the foregoing embodiments. The communication module 1313 is configured to support the communication apparatus in performing a sending action performed by the service discovery network element in step 603 in FIG. 6.

In a possible embodiment, the communication module 1313 is further configured to support the communication apparatus in performing receiving actions performed by the service discovery network element in step 701 and step 703 in the foregoing embodiments. The processing module 1312 is configured to support the communication apparatus in performing processing actions performed by the service discovery network element in step 702 and step 704 in the foregoing embodiments.

The processing module 1312 may be a processor or controller, for example, the processing module may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communication module 1313 may be a transceiver, a transceiver circuit, a communication interface, or the like. The storage module 1311 may be a memory.

Figure 14:
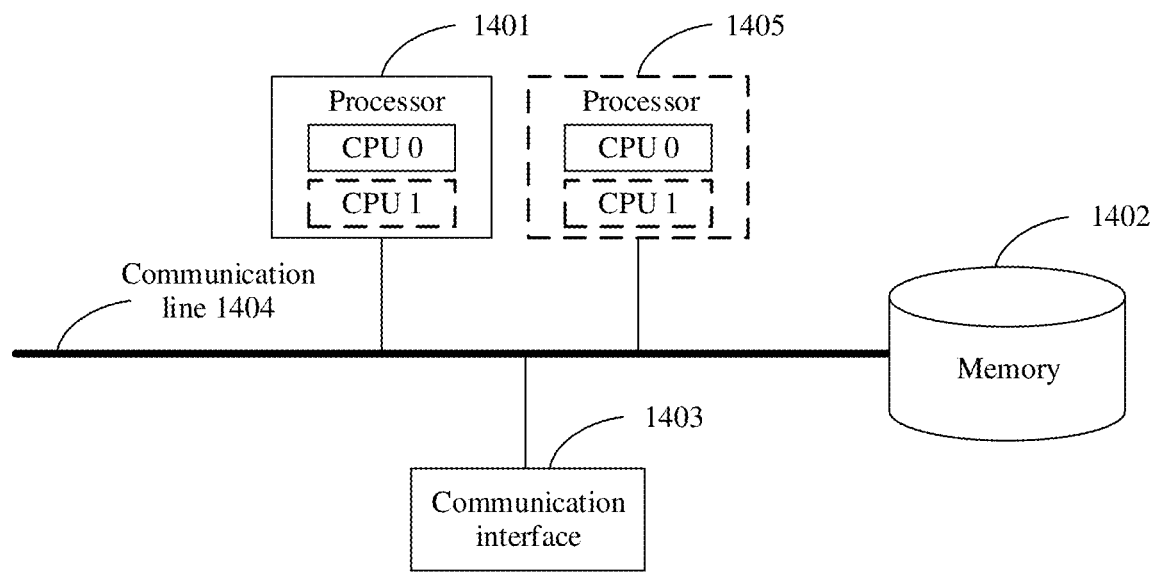
FIG. 14 is a schematic diagram of a structure of a communication device according to an embodiment of this application.

When the processing module 1312 is a processor 1401 or a processor 1405, the communication module 1313 is a communication interface 1403, and the storage module 1311 is a memory 1402, the communication apparatus in this application may be a communication device shown in FIG. 14.

FIG. 14 is a schematic diagram of a hardware structure of a communication device according to an embodiment of this application. The communication device includes the processor 1401, a communication line 1404, and at least one communication interface (in FIG. 14, an example in which the communication interface 1403 is included is only used for description).

In a possible implementation, the communication device may further include the memory 1402.

The processor 1401 may be a general-purpose central processing unit (CPU), a microprocessor, an application-specific integrated circuit (ASIC), or one or more integrated circuits for controlling program execution of the solutions of this application.

The communication line 1404 may include a path for transferring information between the foregoing components.

The communication interface 1403 is applicable to any apparatus such as a transceiver, and is configured to communicate with another device or a communication network such as Ethernet, a radio access network (RAN), or a wireless local area network (WLAN).

The memory 1402 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the communication line 1404. The memory may alternatively be integrated with the processor.

The memory 1402 is configured to store computer-executable instructions for performing the solutions in this application, and the processor 1401 controls execution of the computer-executable instructions. The processor 1401 is configured to execute the computer-executable instructions stored in the memory 1402, to implement the communication method provided in the following embodiments of this application.

In some embodiments, the computer-executable instructions may also be referred to as application code. This is not specifically limited.

In some embodiments, the processor 1401 may include one or more CPUs, for example, a CPU 0 and a CPU 1 in FIG. 14.

In some embodiments, the communication device may include a plurality of processors, for example, the processor 1401 and the processor 1405 in FIG. 14. Each of the processors may be a single-core (single-CPU) processor, or may be a multi-core (multi-CPU) processor. The processor herein may be one or more devices, circuits, and/or processing cores configured to process data (for example, computer program instructions).

In an example, the communication device is a first data analytics network element, or a chip used in a first data analytics network element. In this case, the communication interface 1403 is configured to support the communication device in performing a sending action performed by the first data analytics network element in step 601 in FIG. 6 in the foregoing embodiments. The communication interface 1403 is configured to support the communication device in performing a receiving action performed by the first data analytics network element in step 603 in FIG. 6. The processing unit is further configured to support the communication device in performing a processing action performed by the first data analytics network element in the foregoing embodiments.

In a possible embodiment, the communication interface 1403 is further configured to support the communication device in performing sending actions performed by the first data analytics network element in step 701, step 712, and step 714 in the foregoing embodiments. The processor 1401 and the processor 1405 are further configured to support the communication device in performing step 708, step 711, and step 713 in the foregoing embodiments.

In another example, the communication device is a third data analytics network element, or a chip used in a third data analytics network element. In this case, the processor 1401 and the processor 1405 are configured to support the communication device in performing a processing action performed by the third data analytics network element in step 709 in the foregoing embodiments. The communication interface 1403 is configured to support the communication device in performing a sending action performed by the third data analytics network element in step 710 in the foregoing embodiments.

In a possible implementation, the communication interface 1403 is further configured to support the communication device in performing a receiving action performed by the third data analytics network element in step 712, a receiving action performed by a second data analytics network element in step 714, and a sending action performed by the second data analytics network element in step 703 in the foregoing embodiments.

In still another example, the communication device is a service discovery network element, or a chip used in a service discovery network element. In this case, the communication interface 1403 is configured to support the communication device in performing a receiving action performed by the service discovery network element in step 601 in FIG. 6 in the foregoing embodiments. The processor 1401 and the processor 1405 are further configured to support the communication device in performing a processing action performed by the service discovery network element in step 602 in the foregoing embodiments. The communication interface 1403 is configured to support the communication device in performing a sending action performed by the service discovery network element in step 603 in FIG. 6.

In a possible embodiment, the communication interface 1403 is further configured to support the communication device in performing receiving actions performed by the service discovery network element in step 701 and step 703 in the foregoing embodiments. The processor 1401 and the processor 1405 are configured to support the communication device in performing processing actions performed by the service discovery network element in step 702 and step 704 in the foregoing embodiments.

Figure 15:
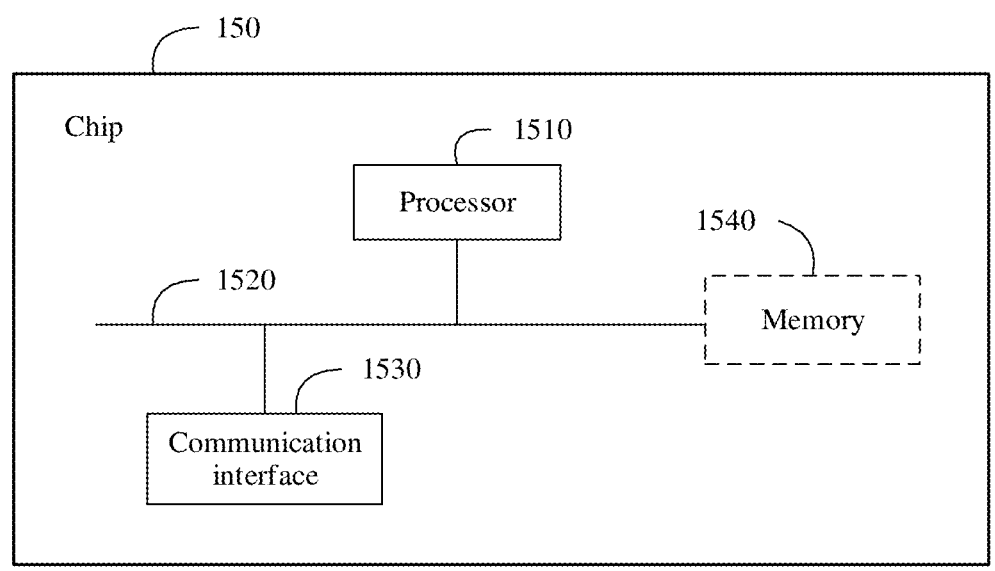
FIG. 15 is a schematic diagram of a structure of a chip according to an embodiment of this application.

FIG. 15 is a schematic diagram of a structure of a chip 150 according to an embodiment of this application. The chip 150 includes one or more (including two) processors 1510 and a communication interface 1530.

In a possible implementation, the chip 150 further includes a memory 1540. The memory 1540 may include a read-only memory and a random access memory, and provide operation instructions and data for the processor 1510. A part of the memory 1540 may further include a nonvolatile random access memory (NVRAM).

In some implementations, the memory 1540 stores the following elements: an executable module or a data structure, a subset thereof, or an extended set thereof.

In this embodiment of this application, the operation instructions stored in the memory 1540 (where the operation instructions may be stored in an operating system) are invoked to perform a corresponding operation.

In a possible implementation, structures of chips used by a first data analytics network element, a third data analytics network element, and a service discovery network element are similar, and different apparatuses may use different chips to implement respective functions.

The processor 1510 controls a processing operation of any one of the first data analytics network element, the third data analytics network element, and the service discovery network element. The processor 1510 may also be referred to as a central processing unit (CPU).

The memory 1540 may include the read-only memory and the random access memory, and provide the instructions and the data for the processor 1510. The part of the memory 1540 may further include the NVRAM. For example, in an application, the memory 1540, the communication interface 1530, and the memory 1540 are coupled together through a bus system 1520. The bus system 1520 may further include a power bus, a control bus, a status signal bus, and the like in addition to a data bus. However, for clear description, various types of buses in FIG. 15 are marked as the bus system 1520.

The methods disclosed in the foregoing embodiments of this application may be applied to the processor 1510, or may be implemented by the processor 1510. The processor 1510 may be an integrated circuit chip, and has a signal processing capability. In an implementation process, the steps in the foregoing methods may be implemented by using a hardware integrated logical circuit in the processor 1510, or by using instructions in a form of software. The processor 1510 may be a general-purpose processor, a digital signal processor (DSP), an ASIC, a field-programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor 1510.

In a possible implementation, the communication interface 1530 is configured to perform receiving and sending steps of the first data analytics network element, the third data analytics network element, and the service discovery network element in embodiments shown in FIG. 6 and FIG. 7A and FIG. 7B. The processor 1510 is configured to perform processing steps of the first data analytics network element, the third data analytics network element, and the service discovery network element in embodiments shown in FIG. 6 and FIG. 7A and FIG. 7B.

The communication unit may be a communication interface of the apparatus, and is configured to receive a signal from another apparatus. For example, when the apparatus is implemented as the chip, the communication unit is a communication interface used by the chip to receive a signal from or send a signal to another chip or apparatus.

According to an aspect, a computer-readable storage medium is provided. The computer-readable storage medium stores instructions. When the instructions are run, the functions of the first data analytics network element in FIG. 6 and FIG. 7A and FIG. 7B are implemented.

According to an aspect, a computer-readable storage medium is provided. The computer-readable storage medium stores instructions. When the instructions are run, the functions of the third data analytics network element in FIG. 6 and FIG. 7A and FIG. 7B are implemented.

According to an aspect, a computer-readable storage medium is provided. The computer-readable storage medium stores instructions. When the instructions are run, the functions of the first data analytics network element in FIG. 6 and FIG. 7A and FIG. 7B are implemented.

According to an aspect, a computer program product including instructions is provided. The computer program product includes the instructions. When the instructions are run, the functions of the first data analytics network element in FIG. 6 and FIG. 7A and FIG. 7B are implemented.

According to another aspect, a computer program product including instructions is provided. The computer program product includes the instructions. When the instructions are run, the functions of the third data analytics network element in FIG. 6 and FIG. 7A and FIG. 7B are implemented.

According to another aspect, a computer program product including instructions is provided. The computer program product includes the instructions. When the instructions are run, the functions of the service discovery network element in FIG. 6 and FIG. 7A and FIG. 7B are implemented.

According to an aspect, a chip is provided. The chip is used in a first data analytics network element. The chip includes at least one processor and a communication interface. The communication interface is coupled to the at least one processor. The processor is configured to run instructions, to implement the functions of the first data analytics network element in FIG. 6 and FIG. 7A and FIG. 7B.

According to another aspect, a chip is provided. The chip is used a third data analytics network element. The chip includes at least one processor and a communication interface. The communication interface is coupled to the at least one processor. The processor is configured to run instructions, to implement the functions of the third data analytics network element in FIG. 6 and FIG. 7A and FIG. 7B.

According to another aspect, a chip is provided. The chip is used in a service discovery network element. The chip includes at least one processor and a communication interface. The communication interface is coupled to the at least one processor. The processor is configured to run instructions, to implement the functions of the service discovery network element in FIG. 6 and FIG. 7A and FIG. 7B.

An embodiment of this application provides a communication system. The communication system includes a first data analytics network element and a service discovery network element. The first data analytics network element is configured to perform the function performed by the first data analytics network element in any one of FIG. 6 and FIG. 7A and FIG. 7B, and the service discovery network element is configured to perform the steps performed by the service discovery network element in any one of FIG. 6 and FIG. 7A and FIG. 7B.

In a possible implementation, the communication system may further include a third data analytics network element. The third data analytics network element is configured to perform the functions performed by the first data analytics network element and the third data analytics network element in FIG. 6 and FIG. 7A and FIG. 7B.

All or some of the foregoing embodiments may be implemented by using software, hardware, firmware, or any combination thereof. When the software is used to implement the foregoing embodiments, all or some of the foregoing embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by the computer, or may be a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are only example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
sending, by a first data analytics network element, a first request to a service discovery network element, wherein the first request requests information about a second data analytics network element, the first request comprises first indication information, and the first indication information indicates a type of the second data analytics network element;
receiving, by the first data analytics network element, information about the second data analytics network element from the service discovery network element, wherein the information about the second data analytics network element indicates the type of the second data analytics network element, and the type of the second data analytics network element indicated by the information about the second data analytics network element is the same as the type of the second data analytics network element indicated by the first indication information;
determining, by the first data analytics network element based on the information about the second data analytics network element, information about a third data analytics network element that performs distributed learning;
receiving, by the first data analytics network element, a sub-model from the third data analytics network element, wherein the sub-model is obtained by the third data analytics network element through training based on data obtained by the third data analytics network element;
determining, by the first data analytics network element, an updated model based on the sub-model from the third data analytics network element; and
sending, by the first data analytics network element, the updated model to the third data analytics network element.

2. The communication method according to claim 1, wherein
a load of the third data analytics network element is lower than a preset load threshold, or
a priority of the third data analytics network element is higher than a preset priority threshold.

3. The communication method according to claim 1, wherein
the information about distributed learning further comprises algorithm information supported by distributed learning, and
the second data analytics network element or the third data analytics network element supports an algorithm corresponding to the algorithm information supported by distributed learning.

4. The communication method according to claim 1, further comprising:
determining, by the first data analytics network element, a target model based on the updated model; and
sending, by the first data analytics network element to the second data analytics network element, the target model and one or more of a model identifier corresponding to the target model, a model version identifier corresponding to the target model, or a data analytics identifier corresponding to the target model.

5. The communication method according to claim 1, further comprising:
sending, by the first data analytics network element before receiving the sub-model from the third data analytics network element, a configuration parameter to the third data analytics network element, wherein the configuration parameter is a parameter used by the third data analytics network element to determine the sub-model.

6. The communication method according to claim 5, wherein the configuration parameter comprises one or more of an initial model, a training set selection criterion, a feature generation method, a training termination condition, a maximum training time, or a maximum waiting time.

7. The communication method according to claim 1, wherein
the type of distributed learning comprises one of horizontal learning, vertical learning, or transfer learning, and
the type of the second data analytics network element is one of a client, a local trainer, or a partial trainer.

8. The communication method according to claim 1, further comprising:
sending, by the first data analytics network element, a second request to the service discovery network element, wherein the second request requests to register information about the first data analytics network element, the information about the first data analytics network element comprises one or more of the information about distributed learning, a range of the first data analytics network element, or second indication information, and the second indication information indicates a type of the first data analytics network element.

9. The communication method according to claim 8, wherein
the first request further comprises the range of the first data analytics network element, and
a range of the second data analytics network element or a range of the third data analytics network element falls within the range of the first data analytics network element.

10. The communication method according to claim 9, wherein the range of the first data analytics network element comprises one or more of an area served by the first data analytics network element, a public land mobile network (PLMN) identifier to which the first data analytics network element belongs, information about a network slice served by the first data analytics network element, a data network name (DNN) served by the first data analytics network element, or device vendor information of the first data analytics network element.

11. The communication method according to claim 8, wherein the type of the first data analytics network element comprises one of a server, a coordinator, a centralized trainer, or a global trainer.

12. The communication method according to claim 1, wherein the distributed learning is federated learning.

13. The communication method according to claim 1, wherein the second data analytics network element is a terminal.

14. A communication apparatus, comprising:
a processor; and
a memory having instructions stored thereon that, when executed by the processor, cause the communication apparatus to:
send a first request to a service discovery network element, wherein the first request requests information about a data analytics network element, the first request comprises first indication information, and the first indication information indicates a type of the data analytics network element;
receive information about the data analytics network element from the service discovery network element, wherein the information about the data analytics network element indicates the type of the data analytics network element, and the type of the data analytics network element indicated by the information about the data analytics network element is the same as the type of the data analytics network element indicated by the first indication information;

determine, based on the information about the data analytics network element, information about a different data analytics network element that performs distributed learning;

receive a sub-model from the different data analytics network element, wherein the sub-model is obtained by the different data analytics network element through training based on data obtained by the different data analytics network element;

determine an updated model based on the sub-model from the different data analytics network element; and send the updated model to the different data analytics network element.

15. The communication apparatus according to claim 14, wherein the apparatus is further caused to:

determine a target model based on the updated model; and send, to the data analytics network element, the target model and one or more of a model identifier corresponding to the target model, a model version identifier corresponding to the target model, or a data analytics identifier corresponding to the target model.

16. A communication system, comprising:

a first data analytics network element; and a service discovery network element, wherein the first data analytics network element is configured to:

send a first request to the service discovery network element wherein the first request requests information about a second data analytics network element, the first request comprises first indication information, and the first indication information indicates a type of the second data analytics network element;

receive information about the second data analytics network element from the service discovery network element, wherein the information about the second data analytics network element indicates the type of the second data analytics network element, and the type of the second data analytics network element indicated by the information about the second data analytics network element is the same as the type of the second data analytics network element indicated by the first indication information;

determine, based on the information about the second data analytics network element, information about a third data analytics network element that performs distributed learning;

receive a sub-model from the third data analytics network element, wherein the sub-model is obtained by the third data analytics network element through training based on data obtained by the third data analytics network element;

determine an updated model based on the sub-model from the third data analytics network element; and send the updated model to the third data analytics network element; and the service discovery network element is configured to:

provide the information about the second data analytics network element for the first data analytics network element in response to the first request from the first data analytics network element.

17. The communication system according to claim 16, wherein the first data analytics network element is further configured to:

determine a target model based on the updated model; and send, to the second data analytics network element, the target model and one or more of a model identifier corresponding to the target model, a model version identifier corresponding to the target model, or a data analytics identifier corresponding to the target model.

* * * * *